United States Patent
Harashina

(10) Patent No.: US 7,638,565 B2
(45) Date of Patent: Dec. 29, 2009

(54) POLYACETAL RESIN COMPOSITION

(75) Inventor: Hatsuhiko Harashina, Fuji (JP)

(73) Assignee: Polyplastics Co., Ltd., Tokyo (JP)

(*) Notice: Subject to any disclaimer, the term of this patent is extended or adjusted under 35 U.S.C. 154(b) by 197 days.

(21) Appl. No.: 10/578,268

(22) PCT Filed: Oct. 22, 2004

(86) PCT No.: PCT/JP2004/015698

§ 371 (c)(1),
(2), (4) Date: May 4, 2006

(87) PCT Pub. No.: WO2005/049728

PCT Pub. Date: Jun. 2, 2005

(65) Prior Publication Data

US 2007/0054998 A1 Mar. 8, 2007

(30) Foreign Application Priority Data

Nov. 10, 2003 (JP) ............................ 2003-380277

(51) Int. Cl.
*C08K 5/27* (2006.01)
*C08K 5/31* (2006.01)
*C08K 5/3492* (2006.01)
*C08K 5/3435* (2006.01)
*C08K 5/09* (2006.01)
*C08K 5/092* (2006.01)
*C08K 5/098* (2006.01)
*C08K 5/10* (2006.01)
*C08K 5/20* (2006.01)
*C08K 5/28* (2006.01)
*C08K 5/49* (2006.01)

(52) U.S. Cl. .................. 524/191; 524/99; 524/100; 524/102; 524/121; 524/195; 524/207; 524/211; 524/359; 524/430

(58) Field of Classification Search ................ 524/91, 524/100, 99, 102, 121, 191, 195, 207, 211, 524/359, 430

See application file for complete search history.

(56) References Cited

U.S. PATENT DOCUMENTS

| 3,152,101 A | 10/1964 | Dolce |
| 3,660,438 A | 5/1972 | Dexter |
| 4,530,991 A | 7/1985 | Hirai et al. |
| 4,894,400 A * | 1/1990 | Haruna et al. ............ 524/91 |
| 4,894,499 A * | 1/1990 | Beck et al. ............... 200/404 |

FOREIGN PATENT DOCUMENTS

| EP | 0 333 660 A2 | 9/1989 |
| EP | 0 333 660 A3 | 9/1989 |
| EP | 1 674 526 A1 | 6/2006 |
| JP | 58-131953 | 8/1983 |
| JP | 03-193753 | 8/1991 |
| JP | 10-036630 | 2/1998 |
| JP | 10-298401 | 11/1998 |
| JP | 2000-26704 | 1/2000 |
| JP | 2000-026705 | 1/2000 |
| JP | 2002-146157 | 5/2002 |
| JP | 2004-204167 | 7/2004 |
| WO | WO 90/09408 | 8/1990 |

OTHER PUBLICATIONS

Supplementary European Search Report dated Jul. 15, 2008.

* cited by examiner

*Primary Examiner*—Kriellion A Sanders
(74) *Attorney, Agent, or Firm*—Nixon & Vanderhye P.C.

(57) ABSTRACT

A polyacetal resin composition comprises a polyacetal resin and a hetero atom-containing aliphatic carboxylic acid hydrazide. The proportion of the hetero atom-containing aliphatic carboxylic acid hydrazide may be about 0.001 to 20 parts by weight relative to 100 parts by weight of the polyacetal resin. The polyacetal resin composition may further comprise at least one member selected from the group consisting of an antioxidant, a heat stabilizer, a processing stabilizer, a weather (light)-resistant stabilizer, an impact resistance improver, a gloss control agent, an agent for improving sliding property, a coloring agent, and a filler. Such a resin composition improves stability of the polyacetal resin and inhibits formaldehyde emission.

18 Claims, No Drawings

POLYACETAL RESIN COMPOSITION

This application is the US national phase of international application PCT/JP2004/015698 filed 22 Oct. 2004 which designated the U.S. and claims benefit of JP 2003-380277, dated 10 Nov. 2003, the entire content of which is hereby incorporated by reference.

TECHNICAL FIELD

The present invention relates to a polyacetal-series resin composition in which formaldehyde emission (or generation) is remarkably inhibited, extrusion property and moldability are excellent, and blooming is suppressible; to a process for producing the same; and to a molded product (or shaped article) formed from the resin composition.

BACKGROUND ART

A polyacetal resin is excellent in mechanical property, fatigue resistance, friction-or abrasion resistance, chemical resistance, and moldability. Therefore, the polyacetal resin has been widely utilized in various fields such as an automotive part, an electric or electronic device part, other precision machinery part, an architectural or pipeline part, a household utensil or cosmetic article part, or a medical device part. However, along with expansion or diversification in application, a polyacetal resin having higher quality has been demanded.

Characteristics (or properties) required for the polyacetal resin include characteristics that mechanical strength in a process step such as an extruding step or a molding step is not deteriorated, that deposit to a metal mold (or mold deposit) is not generated, that mechanical property under a long-term heating condition (heat aging) is adversely affected, and that incomplete (or defective) molding such as silver streak or void is not found in a molded product. As one of the important factors responsible for such deterioration of strength or physical properties, and incomplete molding, the degradation of the polymer upon heating is exemplified. In particular, the polyacetal resin inherently tends to be easily decomposed in an oxidative atmosphere at an elevated temperature or in an acidic or alkaline environment because of its chemical structure. Therefore, the essential need that must be fulfilled for a polyacetal resin includes high thermal stability and minimal emission (or generation) of formaldehyde in the course of processing or from molded products. Formaldehyde is chemically active and ready to be oxidized to formic acid to adversely affect the heat resistance of resin. In addition, when the resin is used as electric or electronic device parts, formaldehyde causes corrosion in metallic contacts or discoloration of the parts due to deposits of an organic compound, and contact errors occur. Furthermore, formaldehyde itself pollutes the working environment in parts assembling as well as the living environment around use of end products.

In order to stabilize chemically active terminals, the following methods are known: for a homopolymer, a method of esterifying the terminal of the polymer by acetylation or other means; and for a copolymer, a method of copolymerizing trioxane and a monomer having an adjacent carbon bond (e.g., a cyclic ether or a cyclic formal) upon polymerization, and then decomposing and removing unstable terminal sites to make the unstable terminal sites stable (or inactive) terminal sites. However, in a heating process, cleavage (or fission) decomposition also occurs in the main chain part of the polymer. Only the above-mentioned treatment is insufficient to prevent the polymer from such a decomposition, and practically, it is considered that addition of a stabilizer (e.g., an antioxidant, and other stabilizers) is essential for such inhibition.

However, even in the case blending these stabilizers, it is difficult to completely inhibit decomposition (or degradation) of the polyacetal resin. In practice, upon melt processing in an extruding step or a molding step for preparing a composition, the polyacetal resin undergoes an action of heat or oxygen inside of a cylinder of an extruder or a molding machine, thereby generating formaldehyde from a decomposed main chain thereof or an insufficiently stabilized terminal thereof, as a result, working environment is worsen in an extruding and molding process. Moreover, in the case carrying out molding for a long period, a finely powdered substance or a tar-like substance is deposited on a metal mold (mold deposit), thereby decreasing working efficiency. In addition, the mold deposit is one of the ultimate factors for deteriorating the surface condition of the molded product. Further, the polymer decomposition causes deterioration in mechanical strength of the resin, and discoloration of the resin. From such a viewpoint, a good deal of effort is continued for establishing more effective stabilizing formulation (or recipe) about the polyacetal resin.

As the antioxidant added to the polyacetal resin, a phenol (or phenolic) compound having steric hindrance (hindered phenol), and an amine compound having steric hindrance (hindered amine) have been known. As other stabilizers, melamine, an alkali metal hydroxide, an alkaline earth metal hydroxide, and an organic or inorganic acid salt have been known. Moreover, antioxidants are generally used in combination with other stabilizers. However, even when such an additive(s) is/are used, it is difficult to avoid formaldehyde emission (or generation) from a molded product of the polyacetal resin.

U.S. Pat. No. 3,152,101 (Patent Document 1) discloses a composition comprising a polyacetal copolymer and a dicarboxylic acid dihydrazide (e.g., an aliphatic dicarboxylic acid dihydrazide having a carbon number of 3 to 10). Although use of such an aliphatic carboxylic acid hydrazide improves heat stability at some level thereby inhibiting emission of formaldehyde, such a composition is low in formability (or moldability). Therefore, mold deposit occurs, or the aliphatic carboxylic acid hydrazide bleeds out of a molded product formed with the composition.

[Patent Document 1] U.S. Pat. No. 3,152,101 (the first and the third columns)

DISCLOSURE OF THE INVENTION

Problems to be Solved by the Invention

It is therefore an object of the present invention to provide a polyacetal resin composition capable of improving heat (or thermal) stability of apolyacetal resin, and melt stability of a polyacetal resin in an extruding step or a molding step; and a process for producing the same; as well as a product (or article) as molded (or shaped) therefrom.

It is another object of the present invention to provide a polyacetal resin composition conducive to a marked inhibition of formaldehyde emission with a small amount of an additive added, and improvement in working environment; and a process for producing the same; as well as a product (or article) as molded (or shaped) therefrom.

It is still another object of the present invention to provide a polyacetal resin composition which is adapted for inhibiting emission of formaldehyde even under severe conditions to suppress deposition of decomposition products on the mold, blooming or bleeding of the decomposition products from a molded product (or a shaped article) and thermal deterioration of the product, and which contributes to upgrading quality of the molded product and improves the moldability; and a process for producing the same; as well as a product (or article) as molded (or shaped) therefrom.

It is further object of the present invention to provide a polyacetal resin composition in which an amount of formaldehyde emission from a polyacetal resin and a molded product therefrom is inhibited to a significantly low level, and a physical property such as weather (light)-resistant stability, impact resistance, (low) gloss property or sliding property is improved; and a product (or article) as molded (or shaped) therefrom.

Means to Solve the Problems

The inventor of the present invention made intensive studies and searches on a series of carboxylic acid hydrazide compounds regarding a stabilizer for a polyacetal resin to achieve the above objects and finally found that a specific aliphatic carboxylic acid hydrazide compound significantly inhibits formaldehyde emission from a molded product of a polyacetal resin, and brings about an excellent moldability and a lowered bleeding out from such a molded product. The present invention was accomplished based on the above findings.

That is, the polyacetal resin composition of the present invention comprises a polyacetal resin, and an aliphatic carboxylic acid hydrazide represented by the following formula (1):

X—(R—C(=O)—NHNH$_2$)$_n$ (1)

wherein X represents a hetero atom or a hetero atom-containing group having n-valence(s), R represents an alkylene group and "n" denotes an integer of 1 to 4.

In the formula(1), the heteroatom-containing group X may be a group corresponding to a hetero atom-containing compound which may comprise a chain or cyclic amine [e.g., an azacycloalkane, an azacycloalkene, an azacycloalkadiene, a cyclic urea (including a cyclic ureide compound), and a cyclic imide], a chain or cyclic alcohol [e.g., a monohydroxyarene, a polyhydroxyarene, and a bisphenol compound (such as biphenol or bisphenol)], or a chain or cyclic ether [e.g., an oxacycloalkane, and an oxaspiroalkane (such as a mono- or polyoxaspiroC$_{6-20}$alkane)], and R may be a straight or branched chain C$_{1-10}$alkylene group (e.g., a straight or branched chain C$_{1-6}$alkylene group). The proportion of the aliphatic carboxylic acid hydrazide may be about 0.001 to 20 parts by weight relative to 100 parts by weight of the polyacetal resin.

The polyacetal resin composition may further comprise at least one member selected from the group consisting of an antioxidant, a heat stabilizer, a processing stabilizer, a weather (light)-resistant stabilizer, an impact resistance improver, a gloss control agent, an agent for improving sliding property (or a slide improver), a coloring agent, and a filler. Moreover, in the polyacetal resin composition, a pellet of the polyacetal resin may coexist with the aliphatic carboxylic acid hydrazide or a master batch containing the aliphatic carboxylic acid hydrazide. Incidentally, the resin composition of the present invention can also improve in heat stability even when the composition does not substantially contain a phosphorus-containing flame retardant.

The present invention also includes a process for producing a polyacetal resin composition, which comprises melt-mixing a polyacetal resin and the aliphatic carboxylic acid hydrazide with an extruder, wherein (a) at least the aliphatic carboxylic acid hydrazide is fed to the extruder through a side feed port thereof and is mixed with the polyacetal resin, and/or (b) the average retention time in the extruder is not longer than 300 seconds.

The present invention further includes a molded product (or molded article or shaped article) formed from the polyacetal resin composition. The molded product may be an automotive part, an electric or electronic device part (an electric and/or electronic device part), an architectural or pipeline part (an architectural and/or pipeline part), a household utensil (or commodity) or cosmetic article part (a household utensil and/or cosmetic article part), or a medical device part.

Effects of the Invention

According to the present invention, since a specific aliphatic carboxylic acid hydrazide is added to a polyacetal resin, heat stability of the polyacetal resin, and melt stability of the polyacetal resin in an extruding process or a molding process can be improved. Moreover, addition of only a small amount of the carboxylic acid hydrazide ensures to inhibit formaldehyde generation significantly, and drastically improves circumferential environment (e.g., working environment, and using environment). Further, the polyacetal resin composition of the present invention can inhibit emission of formaldehyde at an extremely low level even under severe conditions, deposition of decomposition products on the mold (mold deposit), blooming or bleeding of such decomposition products from a molded product, and thermal aging or deterioration of the article, thus contributing to upgrading of the quality and moldability of the molded product. Furthermore, addition of other additive(s) (e.g., a weather (light)-resistant stabilizer, an impact resistance improver, a gloss control agent, an agent for improving sliding property (or a slide improver), a coloring agent, and a filler) ensures to inhibit the amount of formaldehyde emission from the polyacetal resin and the molded product at an extremely low level, and provide a polyacetal resin composition and a molded product which is improved in physical properties such as weather (light)-resistant stability, impact resistance, (low) gloss property, and sliding property.

DETAILED DESCRIPTION OF THE INVENTION

The resin composition of the present invention comprises a polyacetal resin, and a specific carboxylic acid hydrazide.

(Polyacetal Resin)

The polyacetal resin is a macromolecular compound containing oxymethylene group (—OCH$_2$—) as a predominant constituent unit and may include polyacetal homopolymers or polyoxymethylenes (e.g., trade name "Delrin", manufactured by DuPont, U.S.A.; trade name "Tenac 4010", manufactured by Asahi Kasei Corp.) and polyacetal copolymers comprising an oxymethylene unit and a comonomer unit (e.g., trade name "Duracon", manufactured by Polyplastics Co., Ltd.). Referring to such copolymers, the comonomer unit may include oxyalkylene units of about 2 to 6 carbon atoms (preferably about 2 to 4 carbon atoms), for example, oxyethylene (—OCH$_2$CH$_2$—), oxypropylene, and oxytetramethylene groups. The proportion of such comonomer unit may be small and, for example, can be selected from the range of about 0.01 to 20% by mol, preferably about 0.03 to 15% by mol (e.g., 0.05 to 10% by mol), and more preferably about 0.1 to 10% by mol, relative to the whole polyacetal resin (the whole monomer units constituting the polyacetal resin).

The polyacetal copolymer may be a copolymer containing two components, a terpolymer containing three components and so on. The polyacetal copolymer may be also a random copolymer, a block copolymer (e.g., copolymers described in Japanese Patent Publication No. 24307/1990 (JP-2-24307B), trade names "Tenac LA", "Tenac LM" manufactured by Asahi Kasei Corp., and others), or a graft copolymer. Moreover, the polyacetal resin may be linear or branched, or may have a crosslinked structure. In addition, the end (or terminal) groups of the polyacetal resin may have been stabilized by esterification with a carboxylic acid such as acetic acid or propionic acid, or an anhydride thereof, urethanation with an isocyanate compound, or etherification. There is no particular limitation on the degree of polymerization, the degree of branching, or the degree of crosslinking of the polyacetal, provided it can be only melt-molded. There is no particular restriction as to the molecular weight of the polyacetal resin, and, for example, the weight average molecular weight is about 5,000 to 500,000, and preferably about 10,000 to 400,000.

The polyacetal resin can be, for example, produced by polymerizing an aldehyde such as formaldehyde, paraformaldehyde, or acetaldehyde; or a cyclic ether or cyclic formal such as trioxane, ethylene oxide, propylene oxide, butylene oxide, styrene oxide, cyclohexane oxide, cyclohexene oxide, 1,3-dioxolane, 1,3-dioxane, diethylene glycol formal, or 1,4-butanediol formal. Further, as a copolymerizable component, an alkyl or arylglycidyl ether (e.g., methylglycidyl ether, ethylglycidyl ether, phenylglycidyl ether, and naphthylglycidyl ether), an alkylene or polyoxyalkylene glycol diglycidyl ether (e.g., ethylene glycol diglycidyl ether, triethylene glycol diglycidyl ether, and butanediol diglycidyl ether), an alkyl or aryl glycidyl alcohol, a cyclic ester (e.g., β-propiolactone), or a vinyl compound (e.g., styrene, and vinyl ether) can be employed.

(Carboxylic Acid Hydrazide)

One of the characteristic of the present invention resides in addition of a hetero atom-containing aliphatic carboxylic acid hydrazide represented by the following formula (1) and thereby remarkably improving processing stability of a polyacetal resin and remarkably inhibiting generation of formaldehyde.

$$X—(R—C(=O)—NHNH_2)_n \quad (1)$$

In the formula, X represents a hetero atom or n-valent hetero atom-containing group, R represents an alkylene group, and "n" denotes an integer of 1 to 4.

The hetero atom represented by X may include a nitrogen atom, an oxygen atom, a sulfur atom, and others. Moreover, the hetero atom-containing group represented by X may contain at least one hetero atom selected from the group consisting of a nitrogen atom, an oxygen atom and a sulfur atom (particularly a nitrogen atom and an oxygen atom), and may include an amino group (—$NH_2$), an imino group (>NH), a hydroxyl group, a mercapto group, and in addition, a chain (or linear) or cyclic hetero atom-containing group. Incidentally, in the case where the group X is a nitrogen atom-containing group, the group X may usually contain a nitrogen atom (—N<) and/or an imino group (—NH—). Such a nitrogen atom and imino group may be derived from an iminocarbonyl bond (>N—C(=O)—, —NH—C(=O)—) such as an amide bond, an imide bond, a ureide bond or a urethane bond.

The hetero atom-containing compound corresponding to the above-mentioned hetero atom-containing group X may include, for example, a nitrogen-containing compound such as a chain or cyclic amine; an oxygen-containing compound such as a chain or cyclic alcohol, or a chain or cyclic ether; and a sulfur-containing compound corresponding to the oxygen-containing compound. Incidentally, the cyclic hetero atom-containing compound may be a heterocyclic compound having a hetero atom as an atom constituting a ring thereof, or may be a cyclic compound having a structure in which a hetero atom-containing group (e.g., a nitrogen atom, an imino group, an amino group, an oxygen atom, a hydroxyl group, and an ether group) is connected to a ring [e.g., a hydrocarbon ring, and a heterocycle or heterocyclic ring (usually, a hydrocarbon ring)].

As the chain amine, there may be mentioned an aliphatic amine, for example, an amino straight or branched chain alkane; an amino straight or branched chain alkanol; a (poly)alkylenepolyamine such as an alkylenediamine or a dialkylenetriamine; an aryl-straight or branched chain alkylamine; a di(amino straight or branched chain alkyl)arene; and others. Moreover, the cyclic amine may include an alicyclic amine (e.g., a mono- or polyamino-(poly)cycloalkane, and a mono- or polyamino-(poly)cycloalkene), an aromatic amine (e.g., a mono- or polyamino-arene), and in addition, a heterocyclic amine such as an azacycloalkane (e.g., pyrrolidine, piperidine, pipecoline, piperazine, and morpholine), an azacycloalkene or azacycloalkadiene (e.g., pyrroline, imidazoline, imidazolone, and imidazole), a cyclic urea (e.g., an alkyleneurea, a polycyclic urea, and a cyclic ureide such as hydantoin), or a cyclic imide.

The chain alcohol may include, for example, an aliphatic alcohol such as a mono- or polyhydroxyalkane or a polyalkylene glycol. Moreover, examples of the cyclic alcohol may include an alicyclic alcohol (e.g., a mono- or polyhydroxycycloalkane, a mono- or polyhydroxycycloalkene, a mono- or polyhydroxycycloalkadiene, and a hydrogenated bisphenol), an aromatic alcohol (for example, a monohydroxyarene, a polyhydroxyarene, and a bisphenol compound (e.g., biphenol, and bisphenol)). The chain or cyclic alcohol may be a mono- or polyhydric alcohol. Moreover, the chain or cyclic alcohol may have a substituent (for example, the after-mentioned substituent, e.g., a hydrazinocarbonyl group).

The chain ether may include an alkyl-aryl ether, an alkyl-aralkyl ether, and others. The cyclic ether may include an alicyclic ether, an aromatic ether, and in addition, an oxygen-containing ring such as an oxa(poly)cycloalkane, an oxa(poly)cycloalkene or an oxaspiroalkane.

In the case where the group X is a hetero atom-containing group, the group X may be bonded to the group R on a hetero atom thereof (e.g., a nitrogen atom, and an oxygen atom), or may be directly bonded to the group R on a carbon atom thereof. In the case where the group X is a nitrogen atom-containing group, the binding site to the group R may be on a nitrogen atom thereof. In the case where the group X is an oxygen atom-containing group, the binding site to the group R may be on a carbon atom thereof.

The alkylene group represented by R in the formula (1) may include a straight or branched chain $C_{1-10}$ alkylene group such as methylene, ethylene, propylene, trimethylene, or t-butylene group (preferably a $C_{1-6}$ alkylene group), and others.

Moreover, the carboxylic acid hydrazide may be a mono-carboxylic acid hydrazide, or may be a polycarboxylic acid hydrazide in which the "n" is the plural number (e.g., an integer of 2 to 4) in the formula (1). Incidentally, in the formula (1), the number "n" may be preferably an integer of 1 to 3, and more preferably 1 or 2.

The hetero atom-containing aliphatic carboxylic acid hydrazide may have a substituent, for example, an oxo group (=O), a hydroxyl group, an amino group, an N-substituted amino group (e.g., an N-mono- or N,N-di$C_{1-4}$ alkylamino group such as methylamino group or dimethylamino group), an alkyl group (e.g., a straight or branched chain $C_{1-16}$alkyl group such as methyl, ethyl, or isopropyl group; a hydroxy $C_{1-6}$alkyl group such as methylol, or ethylol group; and an amino$C_{1-6}$alkyl group such as aminoethyl group), an aryl group (for example, a $C_{6-10}$aryl group which may have a hydroxyl group as a substituent, e.g., phenyl group and hydroxyphenyl group), an aralkyl group (e.g., a $C_{6-10}$aryl-$C_{1-4}$alkyl group such as benzyl group), and a hydrazinocarbonyl group. The aliphatic carboxylic acid hydrazide may have one or two or more species of the substituent(s) in combination. The substituent may be located on the group R, and may be usually located on the hetero atom-containing group X. Incidentally, the position of the substituent to be substituted is not particularly limited to a specific one, and may be on a carbon atom or on a nitrogen atom. Incidentally, among these substituents, an oxo group may be usually located on a carbon atom to form a carbonyl group (—C(=O)—) together with the carbon atom.

The carboxylic acid hydrazide (1) is not particularly limited to a specific one, and for example, may be obtained by a reaction between the corresponding carboxylic acid ester (1a) and a hydrazine hydrate (or hydrazine $H_2NNH_2$), and others.

$$X—(R—COOR^1)_n \quad (1a)$$

In the formula, $R^1$ represents an alkyl group such as methyl group, ethyl group, or the like. X, R and "n" have the same meanings as defined above.

Incidentally, in a carboxylic acid hydrazide in which the group X is bonded to the group R on a nitrogen atom of the group X, the carboxylic acid ester (1a) as a raw material may be, for example, obtained by a reaction between an amine corresponding to the group X (the above-mentioned chain or cyclic amine) and an α,β-unsaturated carboxylic acid ester corresponding to the group R [e.g., α,β-$C_{1-10}$unsaturated carboxylic acid ester such as methyl (meth)acrylate or ethyl (meth)acrylate (an α,β-$C_{3-10}$unsaturated carboxylic acid ester)]; an addition of the α,β-unsaturated carboxylic acid ester to an amino group or imino group of the amine; and others. Moreover, the carboxylic acid ester(1a) may be also obtained by subjecting an amine derivative corresponding to the group X and (meth)acrylonitrile to an addition reaction, and hydrolyzing and esterifying the addition reaction product. The details of such reactions may be referred to, for example, Japanese Patent Application Laid-Open No. 67256/1984 (JP-59-67256A), Japanese Patent Application Laid-Open No. 178851/1985 (JP-60-178851A), U.S. Pat. No. 4,465,830 specification, and U.S. Pat. No. 4,544,733 specification. Further, in a carboxylic acid hydrazide in which the group X is bonded to the group R on an oxygen atom of the group X, the carboxylic acid ester (1a) as a raw material may be obtained by a reaction between a chain or cyclic alcohol corresponding to the group X and a halocarboxylic acid corresponding to the group R (e.g., a monohalogenated $C_{1-10}$alkane-carboxylic acid such as monochloroacetic acid). The details of the reaction may be referred to, for example, Japanese Patent Application Laid-Open No. 131953/1983 (JP-58-131953A) and Japanese Patent Application Laid-Open No. 183316/1986 (JP-61-183316A).

Moreover, the carboxylic acid hydrazide (1) in which the group X is a nitrogen atom and the number "n" is 3 may be, for example, obtained by allowing concentrated ammonia water to react with triple or more the molar quantity of an α,β-unsaturated carboxylic acid ester (e.g., a (meth)acrylic acid ester) similar to the above-mentioned one to prepare an adduct of ammonia with 3 mol of α,β-unsaturated carboxylic acid ester, and further allowing the resultant with triple or more the molar quantity of hydrazine hydrate in methanol solvent. The details of the reaction may be referred to, for example, Japanese Patent Application Laid-Open No. 193753/1991 (JP-3-193753A). The carboxylic acid hydrazide (1) in which the group X is an oxygen atom and the number "n", is 2 may be, for example, obtained by a reaction between $R^1OOC—R—O—R—COOR^1$ (in the formula, R and $R^1$ have the same meanings as defined above) (e.g., a diester of diglycolic acid) and hydrazide hydrate.

Among such hetero atom-containing aliphatic carboxylic acid hydrazides, a carboxylic acid hydrazide in which the group X is a nitrogen atom may include an N-mono- to tris (hydrazinocarbonylalkyl)amine [for example, amono- to tris (hydrazinocarbonyl straight chain $C_{1-6}$alkyl)amine and a mono- to tris(hydrazinocarbonyl branched chain $C_{1-6}$alkyl) amine (e.g., N,N,N-tris(hydrazinocarbonylethyl)amine)], and others.

Moreover, the concrete examples of the carboxylic acid hydrazide in which the hetero atom-containing compound corresponding to the group X is an aliphatic amine may include an N-mono- or bis(hydrazinocarbonyl straight chain $C_{1-6}$alkyl)aminoalkane and an N-mono- or bis(hydrazinocarbonyl branched chain $C_{1-6}$alkyl)aminoalkane [for example, an N-mono- or bis(hydrazinocarbonyl straight chain $C_{1-6}$alkyl)amino$C_{1-10}$alkane and an N-mono- or bis(hydrazinocarbonyl branched chain $C_{1-6}$alkyl)amino$C_{1-10}$alkane (e.g., N-mono- or N,N-bis(hydrazinocarbonylethyl)aminobutane)], an N-mono- or bis(hydrazinocarbonylalkyl)aminoalkanol [for example, an N-mono- or bis(hydrazinocarbonyl straight chain $C_{1-6}$alkyl)amino$C_{1-10}$alkanol and an N-mono- or bis(hydrazinocarbonyl branched chain $C_{1-6}$alkyl)amino$C_{1-10}$alkanol (e.g., an N-mono- or N,N-bis (hydrazinocarbonylethyl)aminoethanol)], an N-mono- or poly(hydrazinocarbonylalkyl) (poly)alkylenepolyamine [e.g., a mono- or bis(hydrazinocarbonyl$C_{1-6}$alkyl)amino) $C_{1-6}$alkane (incidentally, the $C_{1-6}$alkyl group may be a straight or branched chain), for example, an N-mono- or N,N-bis(hydrazinocarbonyl$C_{1-6}$alkyl)amino$C_{1-6}$alkane (e.g., 1,2-bis(N-mono- or N,N-bis(2-hydrazinocarbonylethyl)amino)ethane, 1,2-bis(N-mono- or N,N-bis(2-hydrazinocarbonylmethyl)amino)ethane, and 1,4-bis(N-mono- or N,N-bis(2-hydrazinocarbonylethyl)amino)butane); a mono- to pentakis(hydrazinocarbonyl$C_{1-6}$alkyl)di$C_{1-6}$alkylenetriamine (incidentally, the $C_{1-6}$alkyl group may be a straight or branched chain), for example, a mono- to pentakis(hydrazinocarbonyl$C_{1-6}$alkyl)di$C_{1-6}$alkylenetriamine such as N,N'-bis(2-hydrazinocarbonylethyl)diethylenetriamine], an N-mono- or bis(hydrazinocarbonylalkyl)amino-aryl-alkane [for example, an N-mono- or bis(hydrazinocarbonyl $C_{1-6}$alkyl)amino-$C_{6-10}$aryl-$C_{1-6}$alkane such as 1-[N-mono- or N,N-bis(hydrazinocarbonylethyl)amino]-4-phenylbutane (incidentally, the $C_{1-6}$alkyl group may be a straight or branched chain)], an N-mono- to poly(hydrazinocarbonylalkyl)aralkylenediamine [for example, a bis(hydrazinocarbonyl straight or branched chain $C_{1-6}$alkylamino$C_{1-6}$alkyl) $C_{6-10}$arene, e.g., a bis(N-mono- or N,N-bis(hydrazinocarbonyl$C_{1-6}$alkyl)amino)$C_{1-6}$alkyl)$C_{6-10}$ arene such as N,N'-bis (2-hydrazinocarbonylethyl)-m-xylylenediamine, N,N'-bis (1-methyl-2-hydrazinocarbonylethyl)-m-xylylene diamine, or 1,4-bis(2'-bis(N-mono- or N,N-bis(hydrazinocarbonylethyl)amino)ethyl)benzene (e.g., a bis(mono- or bis(hydrazinocarbonyl$C_{1-6}$alkylamino)$C_{1-6}$alkyl)$C_{6-10}$arene)], and in addition, carboxylic acid hydrazides described in Japanese Patent Application Laid-Open No. 67256/1984 (JP-59-67256A), Japanese Patent Application Laid-Open No. 178851/1985 (JP-60-178851A) and Japanese Patent Application Laid-Open No. 193753/1991 (JP-3-193753A).

As the concrete examples of the carboxylic acid hydrazide in which the hetero atom-containing compound is an alicyclic amine, there may be mentioned a mono- or poly(hydrazinocarbonyl$C_{1-6}$alkylamino)$C_{5-8}$cycloalkane, for example, an N-mono- or N,N-bis(hydrazinocarbonyl$C_{1-6}$alkyl)amino$C_{5-8}$cycloalkane such as N-mono- or N,N-bis(hydrazinocarbonylethyl)aminocyclohexane or 1,4-bis(N-mono- or N,N-bis(hydrazinocarbonylethyl)amino)cyclohexane, and a mono- or poly(hydrazinocarbonyl$C_{1-6}$alkylamino)$C_{5-8}$cycloalkene corresponding thereto (e.g., an N-mono- or N,N-bis(hydrazinocarbonyl$C_{1-6}$alkyl)amino$C_{5-8}$cycloalkene). Incidentally, in these carboxylic acid hydrazides, the hydrazinocarbonyl$C_{1-6}$alkyl group may be a hydrazinocarbonyl straight or branched chain $C_{1-6}$alkyl group.

The concrete examples of the carboxylic acid hydrazide in which the hetero atom-containing compound is an aromatic amine may include a mono- or poly(hydrazinocarbonyl straight or branched chain $C_{1-6}$alkylamino)arene, for example, a mono(N-mono- or N,N-bis(hydrazinocarbonylalkyl)amino)$C_{6-14}$arene such as N-mono(2-hydrazinocarbonylethyl)aminobenzene; a bis(N-mono- or N,N-bis(hydrazinocarbonylalkyl)amino)$C_{6-14}$arene such as N,N-bis(2-hydrazinocarbonylethyl)aminobenzene, 1,2-, 1,3- or 1,4-bis(N-mono- or N,N-bis(2-hydrazinocarbonylethyl)amino)benzene; a mono- or bis(N-mono(hydrazinocarbonylalkyl)amino)bis$C_{6-10}$aryl such as N-mono(2-hydrazinocarbonylethyl)aminobiphenyl, or a bis(N-(hydrazinocarbonylalkyl)amino$C_{6-10}$aryl)straight or branched chain $C_{1-4}$alkane [e.g., bis(N-(2-hydrazinocarbonylethyl)aminophenyl)methane, and bis(N-(1-methyl-2-hydrazinocarbonylethyl)aminophenyl)methane]; a mono- or bis (N,N-bis(hydrazinocarbonylalkyl)amino)bis$C_{6-10}$aryl such as N,N-bis(2-hydrazinocarbonylethyl)aminobiphenyl, an bis (N,N-bis(hydrazinocarbonylalkyl)amino$C_{6-10}$aryl) straight or branched chain $C_{1-4}$alkane [e.g., bis(N,N-bis(2-hydrazinocarbonylethyl)aminophenyl) methane, and bis(N,N-bis(1-methyl-2-hydrazinocarbonylethyl)aminophenyl)methane], and in addition, carboxylic acid hydrazides described in U.S. Pat. No. 4,544,733 specification.

As the concrete examples of the carboxylic acid hydrazide in which the hetero atom-containing compound is an azacycloalkane, there may be mentioned a mono- or polyaza $C_{5-8}$cycloalkane having a hydrazinocarbonyl straight or branched chain $C_{1-6}$alkyl group, for example, a 1-(hydrazinocarbonylalkyl)piperidine which may have the above-mentioned substituent (e.g., a $C_{1-4}$alkyl group) on a piperidine ring thereof, such as 1-(2-hydrazinocarbonylethyl)piperidine or 1-(2-hydrazinocarbonylethyl)pipecoline; a 1-mono- or 1,4-bis(hydrazinocarbonylalkyl)piperazine which may have the above-mentioned substituent (e.g., a $C_{1-4}$alkyl group) on a piperazine ring thereof, such as 1-mono- or 1,4-bis(2-hydrazinocarbonylethyl)piperazine, 1-mono- or 1,4-bis(1-methyl-2-hydrazinocarbonylethyl)piperazine, or 1-mono- or 1,4-bis(2-hydrazinocarbonylethyl)-2,5-dimethylpiperazine; and others. Moreover, the carboxylic acid hydrazide may also include a 4-(hydrazinocarbonyl straight or branched chain $C_{1-6}$alkyl)morpholine such as 4-(hydrazinocarbonylethyl)morpholine.

The carboxylic acid hydrazide in which the hetero atom-containing compound is an azacycloalkene or an azacycloalkadiene may include a hydrazinocarbonyl straight or branched chain $C_{1-6}$alkylaza$C_{5-8}$cycloalkene which may have the above-mentioned substituent (e.g., a $C_{1-4}$alkyl group, a $C_{6-10}$aryl group, and an oxo group) on an azacycloalkene ring thereof [for example, a monoazacycloalkene such as N-(2-hydrazinocarbonylethyl)pyrroline; and a diazacycloalkene such as an N-hydrazinocarbonylalkylimidazoline compound (e.g., 1-(2-hydrazinocarbonylethyl)-2-imidazoline, 1-(2-hydrazinocarbonylethyl)-3-imidazoline, and 1-mono- or 1,3-bis(2-hydrazinocarbonylethyl)-4-imidazoline), or an N-hydrazinocarbonylalkylimidazolone compound (e.g., 1-mono- or 1,3-bis(2-hydrazinocarbonylethyl)-2(3H)-imidazolone, 1-(2-hydrazinocarbonylethyl)-4(5H)-imidazolone, and 1-(2-hydrazinocarbonylethyl)-5(4H)-imidazolone)], a hydrazinocarbonyl straight or branched chain $C_{1-6}$alkylaza$C_{5-8}$cycloalkene which may have the above-mentioned substituent (e.g., a $C_{1-4}$alkyl group, and a $C_{6-10}$aryl group) on an azacycloalkadiene ring thereof [for example, a monoazacycloalkadiene such as 1-(2-hydrazinocarbonylethyl)pyrrole; and a Diazacycloalkadiene such as an N-hydrazinocarbonylalkylimidazole compound (e.g., a 1-(hydrazinocarbonylalkyl)imidazole compound such as 1-(2-hydrazinocarbonylethyl)imidazole, 1-(2-hydrazinocarbonylethyl)-2-methylimidazole, 1-(2-hydrazinocarbonylethyl)-2-undecylimidazole, 1-(2-hydrazinocarbonylethyl)-2-phenylimidazole, 1-(2-hydrazinocarbonylethyl)-2-ethyl-4-methylimidazole, or 1-(2-hydrazinocarbonylethyl)-2-phenyl-4-methylimidazole; and a 2-(hydrazinocarbonylalkyl)imidazole compound such as 2-(hydrazinocarbonylethyl)imidazole)], and others.

The carboxylic acid hydrazide in which the hetero atom-containing compound is a cyclic urea may include, for example, an N-mono- or N,N'-bis(hydrazinocarbonylalkyl)alkyleneurea [e.g., an N-mono- or N,N'-bis(hydrazinocarbonyl straight or branched chain $C_{1-6}$alkyl)$C_{1-8}$alkylene-urea such as 1-(2-hydrazinocarbonylethyl)ethyleneurea, 1,3-bis (2-hydrazinocarbonylethyl)ethyleneurea, 1,3-bis(1-methyl-2-hydrazinocarbonylethyl)ethyleneurea, or 1,3-bis(2-hydrazinocarbonylethyl)propyleneurea], an N-mono- or poly (hydrazinocarbonylalkyl)polycyclic urea [for example, an N-mono- to tetra(hydrazinocarbonyl straight or branched chain $C_{1-6}$alkyl)acetyleneurea which may have a substituent (e.g., a $C_{1-4}$alkyl group) on an acetyleneurea thereof, e.g., 1-mono- to 1,3,4,6-tetra(2-hydrazinocarbonylethyl)acetyleneurea, 1-mono- to 1,3,4,6-tetra(1-methyl-2-hydrazinocarbonylethyl)acetyleneurea, and 3-mono- or 3,4-bis(1-methyl-2-hydrazinocarbonylethyl)-1,6-dimethylacetyleneurea], and in addition, a cyclic ureide having a hydrazinocarbonylalkyl group.

As the cyclic ureide having a hydrazinocarbonylalkyl group (e.g., a hydrazinocarbonyl straight or branched chain $C_{1-6}$alkyl group), there may be mentioned a ureide of a dicarboxylic acid, such as N-mono- or N,N'-bis(2-hydrazinocarbonylethyl)barbituric acid; a ureide of a β-aldehydic acid, such as N-mono- or N,N'-bis(2-hydrazinocarbonylethyl) uracil; a cyclic diureide such as an N-mono to tetrakis(2-hydrazinocarbonylethyl)uric acid; and in addition, a ureide of an a-hydroxy acid, e.g., a hydantoin having a hydrazinocarbonylalkyl group.

The hydantoin having a hydrazinocarbonylalkyl group may include 1- or 3-mono(hydrazinocarbonylalkyl)hydantoin, 1,3-bis(hydrazinocarbonylalkyl)hydantoin, and others. The hydantoin may have one or two substituent(s) (e.g., a straight or branched chain $C_{1-6}$alkyl group such as methyl group, and a $C_{6-10}$aryl group such as phenyl group) at the 5-position, or two substituents of the 5-position may form a ring together with a carbon atom of the 5-position. Such a compound may include 1- or 3-mono(hydrazinocarbonylalkyl)hydantoin [e.g., a hydrazinocarbonyl straight or branched chain $C_{1-6}$alkylhydantoin such as 1-(hydrazinocarbonylethyl)hydantoin or 3-(hydrazinocarbonylethyl)-5,5-dimethylhydantoin], a 1,3-bis(hydrazinocarbonyl straight or branched chain $C_{1-6}$alkyl)hydantoin [e.g., a 5-mono- or 5,5-dialkyl-hydantoin such as 1,3-bis(2-hydrazinocarbonylethyl)-5-methylhydantoin, 1,3-bis(2-hydrazinocarbonylethyl)-5-isopropylhydantoin, 1,3-bis(2-hydrazinocarbonylethyl)-5,5-dimethylhydantoin or 1,3-bis(1-methyl-2-hydrazinocarbonylethyl)-5,5-dimethylhydantoin (e.g., a di-straight or branched chain $C_{1-4}$alkyl-hydantoin); a 5-mono- or 5,5-di$C_{6-10}$aryl-hydantoin such as 1,3-bis(2-hydrazinocarbonylethyl)-5-phenylhydantoin; and a 5,5-$C_{3-8}$alkylenespirohydantoin such as 1,3-bis(2-hydrazinocarbonylethyl)-5,5-pentamethylenespirohydantoin], and in addition, hydantoincarboxylic acid hydrazides described in U.S. Pat. No. 4,465,830 specification. Among others, the preferred compound includes one having one or two substituent(s) at the 5-position of a hydantoin ring thereof.

The carboxylic acid hydrazide in which the hetero atom-containing compound corresponding to the group X is a cyclic imide may include a cyclic imide having a hydrazinocarbonylalkyl group, for example, an N-(hydrazinocarbonyl straight or branched chain $C_{1-6}$alkyl)$C_{4-8}$cyclic imide such as N-(2-hydrazinocarbonylethyl)succinimide or N-(2-hydrazinocarbonylethyl)glutarimide, and in addition, a $C_{8-12}$condensed cyclic imide in which the $C_{4-8}$cyclic imide and a benzene ring are condensed together [e.g., an N-(hydrazinocarbonyl straight or branched chain $C_{1-6}$alkyl) $C_{8-12}$aromatic polycarboxylic acid imide which may have a substituent (e.g., a $C_{1-4}$alkyl group such as methyl group; a carboxyl group; and a hydrazinocarbonyl group) on a benzene ring thereof, such as N-(2-hydrazinocarbonylethyl)phthalimide, N-(1-methyl-2-hydrazinocarbonylethyl)phthalimide, N-(hydrazinocarbonylethyl)-4-hydrazinocarbonylphthalimide, or N-mono- or N,N'-bis(hydrazinocarbonylethyl)pyromellitimide].

On the other hand, the carboxylic acid hydrazide in which X is an oxygen atom may include a bis(hydrazinocarbonyl straight or branched chain $C_{1-6}$alkyl)ether such as bis(hydrazinocarbonylmethyl)ether, bis(2-hydrazinocarbonylethyl)ether, or bis(1-methyl-2-hydrazinocarbonylethyl)ether.

The examples of the carboxylic acid hydrazide in which the hetero atom-containing compound corresponding to the group X is an aliphatic alcohol may include a mono- or poly(hydrazinocarbonylalkyloxy)alkane [for example, a mono- to tetrakis(hydrazinocarbonylalkoxy)alkane such as 1,2-bis(2-hydrazinocarbonylethyloxy)ethane, 1,3-bis(2-hydrazinocarbonylethyloxy)propane, 1,4-bis(2-hydrazinocarbonylethyloxy)butane, 1,3-bis(2-hydrazinocarbonylethyloxy)-2,2-dimethylpropane, 1,2,3-tris(2-hydrazinocarbonylethyloxy)propane, or tetrakis(2-hydrazinocarbonylethyloxymethyl)methane (e.g., a hydrazinocarbonyl straight chain $C_{1-6}$alkoxy straight or branched chain $C_{1-6}$alkane, and a hydrazinocarbonyl branched chain $C_{1-6}$alkoxy straight or branched chain $C_{1-6}$alkane)], and a polyalkylene glycol-bis(hydrazinocarbonylalkyl)ether [for example, a poly$C_{2-4}$alkylene glycol-bis(hydrazinocarbonyl$C_{1-6}$alkyl) ether such as diethylene glycol-bis(2-hydrazinocarbonylethyl)ether, or a polyethylene glycol-bis(2-hydrazinocarbonylethyl) ether].

The concrete examples of the carboxylic acid hydrazide in which the hetero atom-containing compound is an alicyclic alcohol may include, for example, a mono- or poly(hydrazinocarbonylalkyloxy)cycloalkane [e.g., a (poly)$C_{5-8}$cycloalkane such as mono- or di(hydrazinocarbonylethoxy)cyclohexane, or hydrazinocarbonylethoxydecalin], a mono- or poly(hydrazinocarbonylalkyloxy)cycloalkene [e.g., a (poly)$C_{5-8}$cycloalkene such as mono- or di(hydrazinocarbonylethoxy)cyclohexene], a mono- or poly(hydrazinocarbonylalkyloxy)cycloalkadiene [e.g., a (poly)$C_{5-8}$cycloalkadiene such as mono- or di(hydrazinocarbonylethoxy)cyclohexadiene], and a hydrazinocarbonyl alkyl ether of a hydrogenated bisphenol compound [e.g., 4,4'-(2-hydrazinocarbonylethoxy)hydrogenated biphenyl, and bis(4-(2-hydrazinocarbonylethoxy)cyclohexyl)methane].

As the carboxylic acid hydrazide in which the hetero atom-containing compound corresponding to the group X is an aromatic alcohol, there may be mentioned a mono(hydrazinocarbonyl straight or branched chain $C_{1-6}$alkoxy)arene, a poly(hydrazinocarbonyl straight or branched chain $C_{1-6}$alkoxy)arene, and others. The arene ring constituting the carboxylic acid hydrazide may have one or a plurality of substituent(s) (e.g., a $C_{1-4}$alkyl group such as methyl group, a carboxyl group, and a hydrazinocarbonyl group). Such a compound may include, for example, a monohydrazinocarbonylalkoxy$C_{6-10}$arene [e.g., (hydrazinocarbonylmethyloxy)benzene, (2-hydrazinocarbonylethyloxy)benzene, 1,2-, 1,3- or 1,4-bis(hydrazinocarbonylmethyloxy)benzene, 1,2-, 1,3- or 1,4-bis(2-hydrazinocarbonylethyloxy)benzene, 1,3,5-tris(2-hydrazinocarbonylethyloxy)benzene, 2-, 3- or 4-(hydrazinocarbonylmethyloxy)benzoicacidhydrazide, 2-, 3- or 4-(2-hydrazinocarbonylethyloxy)benzoic acid hydrazide, 2-, 3- or 4-(1-methyl-2-hydrazinocarbonylethyloxy)benzoic acid hydrazide, (hydrazinocarbonylmethyloxy)naphthalene, 3-(hydrazinocarbonylethyloxy)-2-naphthalenecarboxylic acid hydrazide, and 6-(hydrazinocarbonylethyloxy)-2-naphthalenecarboxylic acid hydrazide], a mono- or bis(hydrazinocarbonylalkoxy)bis$C_{6-10}$aryl [e.g., a biphenyl compound such as 4,4'-bis(hydrazinocarbonylmethyloxy)biphenyl, 4,4'-bis(2-hydrazinocarbonylethyloxy)biphenyl, 4,4'-bis(1-methyl-2-hydrazinocarbonylethyloxy)biphenyl, or 4'-(2-hydrazinocarbonylethyloxy)-4-biphenylcarboxylic acid hydrazide; a bis$C_{6-10}$aryl straight or branched chain $C_{1-4}$alkane such as 4,4'-bis(hydrazinocarbonylmethyloxy)diphenylmethane, bis(4-(2-hydrazinocarbonylethyloxy)phenyl)methane, 2,2-bis(4-(hydrazinocarbonylmethyloxy)phenyl)propane, 2,2-bis(4-(2-hydrazinocarbonylethyloxy)phenyl)propane, or 2,2-bis(4-(1-methyl-2-hydrazinocarbonylethyloxy)phenyl) propane; and bis(4-(2-hydrazinocarbonylethyloxy)phenyl)ether, bis(4-(2-hydrazinocarbonylethyloxy)phenyl)sulfide, bis(4-(2-hydrazinocarbonylethyloxy)phenyl)sulfone, and bis(4-(2-hydrazinocarbonylethyloxy)phenyl)ketone], and in addition, carboxylic acid hydrazides described in Japanese Patent Application Laid-Open No. 131953/1983 (JP-58-131953A), Japanese Patent Application Laid-Open No. 24714/1984 (JP-59-24714A), and Japanese Patent Application Laid-Open No. 183316/1986 (JP-61-183316A). The process for preparing these carboxylic acid hydrazides may be referred to, for example, JP-58-131953A, JP-59-24714A, and JP-61-183316A.

The concrete examples of the carboxylic acid hydrazide in which the hetero atom-containing compound is an alicyclic ether may include, for example, a $C_{1-10}$alkoxy-hydrazinocarbonyl straight or branched chain $C_{1-6}$alkyl-$C_{5-8}$cycloalkane such as 1-ethoxy-4-(2'-hydrazinocarbonylethyl)cyclohexane; and a bis((mono- or bishydrazinocarbonyl$C_{1-6}$alkyl)$C_{5-8}$cycloalkyl)ether such as cyclohexyl-4-(2'-hydrazinocarbonylethyl)cyclohexylether, or bis(4-(2'-hydrazinocarbonylethyl)cyclohexyl)ether (e.g., a bis(hydrazinocarbonyl straight or branched chain $C_{1-6}$alkyl$C_{5-8}$cycloalkyl)ether).

As the concrete examples of the carboxylic acid hydrazide in which the hetero atom-containing compound is an aromatic ether, there may be mentioned, for example, a $C_{1-10}$alkoxy-hydrazinocarbonyl straight or branched chain $C_{1-6}$alkyl-$C_{6-10}$arene such as 1-ethoxy-4-(2'-hydrazinocarbonylethyl)benzene; and a bis((mono- or bishydrazinocarbonyl$C_{1-6}$alkyl)$C_{6-10}$aryl) ether such as 4- (2'-hydrazinocarbonylethyl)phenyl-phenyl ether or bis(4-(2'-hydrazinocarbonylethyl)phenyl)ether (e.g., a bis(hydrazinocarbonyl straight or branched chain $C_{1-6}$alkyl $C_{6-10}$aryl)ether).

The carboxylic acid hydrazide in which the hetero atom-containing compound corresponding to the group X is an oxygen-containing ring may include, for example, a hydrazinocarbonylalkyl (e.g., hydrazinocarbonyl straight or branched chain $C_{1-6}$alkyl)oxacycloalkane [for example, a 5- to 8-membered mono- or polyoxacycloalkane (e.g., a mono- or dioxacycloalkane) which may have the above-mentioned substituent (e.g., an alkyl group, and a hydroxyalkyl group) on an oxacycloalkane ring thereof, e.g., hydrazinocarbonylethyltetrahydrofuran, 5-methylol-5-ethyl-2-(2-hydrazinocarbonylethyl)-1,3-dioxane, and 5-methylol-5-ethyl-2-(hydrazinocarbonylalkyl)-1,3-dioxane (e.g., 5-methylol-5-ethyl-2-(1,1-dimethyl-2-hydrazinocarbonylethyl)-1,3-dioxane)], a hydrazinocarbonylalkyl (e.g., a hydrazinocarbonyl straight or branched chain $C_{1-6}$alkyl)oxaspiroalkane [for example, a 3,9-bis(hydrazinocarbonylalkyl)-2,4,8,10-tetraoxaspiro[5.5]undecane (e.g., a mono- or polyoxaspiro$C_{6-20}$alkane (e.g., a mono- to tetraoxaspiro $C_{8-16}$alkane) such as 3,9-bis(hydrazinocarbonylmethyl)-2,4,8,10-tetraoxaspiro[5.5]undecane, 3,9-bis(2-hydrazinocarbonylethyl)-2,4,8,10-tetraoxaspiro[5.5]undecane, or 3,9-bis(1,1-dimethyl-1-hydrazinocarbonylmethyl)-2,4,8,10-tetraoxaspiro[5.5]undecane)], anoxacycloalkene or oxacycloalkadiene having a hydrazinocarbonylalkyl group (e.g., a hydrazinocarbonyl straight or branched chain Cl-6alkyl group) (e.g., a 5- to 8-membered mono- or dioxacycloalkene or cycloalkadiene such as hydrazinocarbonylethylfuran, hydrazinocarbonylethylpyran, or hydrazinocarbonylethyl-2H,4H-1,3-dioxine; hydrazinocarbonylethylisobenzofuran, and hydrazinocarbonylethylchromen); and others.

These hetero atom-containing a liphatic carboxylic acid hydrazides may be used singly or in combination.

Among the hetero atom-containing aliphatic carboxylic acid hydrazides, the hetero atom-containing compound (e.g., a cyclic amine such as a cyclic ureide compound, and a cyclic ether such as an oxaspiroalkane) having a hydrazinocarbonyl straight or branched chain $C_{1-4}$alkyl group is preferred. As the aliphatic carboxylic acid hydrazide, in particular, a hydrazinocarbonylalkylhydantoin which may have a substituent (e.g., a straight or branched chain alkyl group) at the 5-position [for example, a 1,3-bis(hydrazinocarbonylalkyl)-5-mono(or 5,5-di)alkylhydantoin such as 1,3-bis(2-hydrazinocarbonylethyl)-5-isopropylhydantoin], and a mono- or poly(hydrazinocarbonylalkyl)-oxaspiro$C_{6-20}$alkane (e.g., a monooxaspiroalkane, and a polyoxaspiroalkane) such as a 3,9-bis(hydrazinocarbonylalkyl)-2,4,8,10-tetraoxaspiro[5.5] undecane (for example, 3,9-bis(2-hydrazinocarbonylethyl)-2,4,8,10-tetraoxaspiro[5.5]undecane) are preferred.

Addition of a small amount of such a carboxylic acid hydrazide to a polyacetal resin realizes stabilizing effects far superior to conventional stabilizers, and thus obtained polyacetal resin composition is excellent in moldability (mold-releasing property, mold deposit). Moreover, bleeding out (or blooming property) of the carboxylic acid hydrazide from a molded product formed from the polyacetal resin composition can be significantly improved.

The proportion of the aliphatic carboxylic acid hydrazide may be, for example, about 0.001 to 20 parts by weight, preferably about 0.005 to 10 parts by weight, and more preferably 0.01 to 5 parts by weight (e.g., about 0.05 to 2 parts by weight), relative to 100 parts by weight of the polyacetal resin.

The carboxylic acid hydrazide can impart significant stability and processing stability to the polyacetal resin even when the carboxylic acid hydrazide is used alone. Besides, the carboxylic acid hydrazide may be used in combination with at least one member selected from the group consisting of an antioxidant, a processing stabilizer, a heat stabilizer, a weather (light)-resistant stabilizer, an impact resistance improver, a gloss control agent, an agent for improving sliding property (or a slide improver), a coloring agent, and a filler.

Incidentally, many of stabilizers (an antioxidant, a processing stabilizer, a heat stabilizer, and a weather (light)-resistant stabilizer) contain an ester bond [—C(=O)O—] as a structural unit in a molecule thereof. Even when the above-mentioned carboxylic acid hydrazide is used in combination with such a stabilizer having an ester bond, the polyacetal resin can be stabilized.

(Antioxidant)

The antioxidant may include a hindered phenol compound (or hindered phenol-series compound), and a hindered amine compound (orhinderedamine-series compound), and others.

The hindered phenol-series compound may include a conventional phenol-series antioxidant or stabilizer, for example, a monocyclic hindered phenolic compound (e.g., 2,6-di-t-butyl-p-cresol), a polycyclic hindered phenolic compound in which rings are connected or bonded to each other through a hydrocarbon group or a group containing a sulfur atom [e.g., a C.sub.1-10alkylene-bis to tetrakis(t-butylphenol) such as 2,2'-methylenebis(4-methyl-6-t-butylphenol), 4,4'-methylenebis(2,6-di-t-butylphenol) or 1,1,3-tris(2-methyl-4-hydroxy-5-t-butylphenyl)butane; a $C_{2-10}$alkenylene-bis to tetrakis(t-butylphenol) such as 4,4'-butylidenebis(3-methyl-6-t-butylphenol); a $C_{6-20}$arylene or aralkylene-bis to tetrakis(t-butylphenol) such as 1,3,5-trimethyl-2,4,6-tris(3,5-di-t-butyl-4-hydroxybenzyl)benzene; and a bis(t-butylphenol) in which t-butylphenol groups are connected or bonded to each other through a group having a sulfur atom, for example, 4,4'-thiobis(3-methyl-6-t-butylphenol)], a hindered phenolic compound having an ester group or an amide group [e.g., a t-butylphenol having a $C_{2-10}$alkylenecarbonyloxy group, exemplified by n-octadecyl-3-(4'-hydroxy-3',5'-di-t-butylphenyl)propionate or n-octadecyl-2-(4'-hydroxy-3',5'-di-t-butylphenyl)propionate; a bis to tetrakis(t-butylphenol) in which t-butylphenol groups are connected or bonded to each other through a polyol ester of a fatty acid, exemplified by 1,6-hexanediol-bis[3-(3,5-di-t-butyl-4-hydroxyphenyl)propionate], triethylene glycol-bis[3-(3-t-butyl-5-methyl-4-hydroxyphenyl)propionate] or pentaerythritol tetrakis [3-(3,5-di-t-butyl-4-hydroxyphenyl)propionate]; a bis to tetrakis(t-butylphenol) having a heterocyclic group and a $C_{2-10}$alkylenecarbonyloxy group, exemplified by 3, 9-bis [2-(3-(3-t-butyl-4-hydroxy-5-methylphenyl)propionyloxy}-1,1-dimethylethyl]-2,4,8,10-tetraoxaspiro[5.5]undecane; at-alkylphenol (e.g., t-butylphenol, and t-pentylphenol) having a $C_{3-10}$alkenylcarbonyloxy group, exemplified by 2-t-butyl-6-(3'-t-butyl-5'-methyl-2'-hydroxybenzyl)-4-methylphenylacrylate-e or 2-[1-(2-hydroxy-3,5-di-t-pentylphenyl)ethyl]-4,6-di-t-pentylphenylacrylate; a hindered phenolic compound having a phosphonic ester group, exemplified by di-n-octadecyl-3,5-di-t-butyl-4-hydroxybenzylphosphonate; a hindered phenolic compound having an amide unit, exemplified by N,N'-hexamethylenebis(3,5-di-t-butyl-4-hydroxy-dihydrocinnamamide), N,N'-ethylenebis[3-(3,5-di-t-butyl-4-hydroxyphenyl)propionamide], N,N'-tetramethylenebis[3-(3,5-di-t-butyl-4-hydroxyphenyl) propionamide], N,N '-hexamethylenebis[3-(3,5-di-t-butyl-4-hydroxyphenyl)propionamide], N,N'-ethylenebis[3-(3-t-butyl-5-methyl-4-hydroxyphenyl)propionamide], N,N'-hexamethylenebis[3-(3-t-butyl-5-methyl-4-hydroxyphenyl) propionamide], N,N'-bis[3-(3,5-di-t-butyl-4-hydroxyphenyl)propionyl]hydrazine, N,N'-bis[3-(3-t-butyl-5-methyl-4-hydroxyphenyl)propionyl]hydrazine, 1,3,5-tris (3,5-di-t-butyl-4-hydroxybenzyl)isocyanurate, or 1,3,5-tris (4-t-butyl-3-hydroxy-2,6-dimethylbenzyl)isocyanurate], and others. Among them, a phenolic compound having a t-butyl group (particularly, a plurality of t-butyl groups), in particular, a compound having a plurality of t-butylphenol sites, is preferred. These hindered phenol-series compounds may be used singly or in combination.

The hindered amine-series compound may include a piperidine derivative having a steric hindrance group, for example, an ester group-containing piperidine derivative [for example, an aliphatic acyloxypiperidine (e.g., a $C_{2-20}$aliphatic acyloxy-tetramethylpiperidine) such as 4-acetoxy-2,2, 6,6-tetramethylpiperidine, 4-stearoyloxy-2,2,6,6-tetramethylpiperidine or 4-acryloyloxy-2,2,6,6-tetramethylpiperidine; an aromatic acyloxypiperidine (e.g., a $C_{7-11}$aromatic acyloxy-tetramethylpiperidine) such as 4-benzoyloxy-2,2,6,6-tetramethylpiperidine; an aliphatic di-ortricarboxylic acid-bis- or trispiperidyl ester (e.g., a $C_{2-20}$aliphatic dicarboxylic acid-bispiperidyl ester) such as bis(2,2,6,6-tetramethyl-4-piperidyl)oxalate, bis(2,2,6,6-tetramethyl-4-piperidyl)malonate, bis(2,2,6,6-tetramethyl-4-piperidyl)adipate, bis(1,2,2, 6,6-pentamethyl-4-piperidyl)adipate, bis(2,2,6,6-tetramethyl-4-piperidyl)sebacate, or bis(1,2,2,6,6-pentamethyl-4-piperidyl)sebacate; an aromatic di- to tetracarboxylic acid-bis- to tetrakispiperidyl ester (e.g., an aromatic di- or tricarboxylic acid-bis- or trispiperidyl ester) such as bis(2,2,6,6-tetramethyl-4-piperidyl)terephthalate or tris(2,2,6,6-tetramethyl-4-piperidyl)benzene-1,3,5-tricarboxylate], an ether group-containing piperidine derivative [for example, a $C_{1-10}$alkoxypiperidine (e.g., a $C_{1-6}$alkoxy-tetramethylpiperidine) such as 4-methoxy-2,2,6,6-tetramethylpiperidine; a $C_{5-8}$cycloalkyloxy-piperidine such as 4-cyclohexyloxy-2,2,6,6-tetramethylpiperidine; an aryloxypiperidine such as 4-phenoxy-2,2,6,6-tetramethylpiperidine; a $C_{6-10}$aryl-$C_{1-4}$alkyloxy-piperidine such as 4-benzyloxy-2,2,6,6-tetramethylpiperidine; or an alkylenedioxy-bispiperidine (e.g., a $C_{1-10}$alkylenedioxy-bispiperidine) such as 1,2-bis(2,2,6,6-tetramethyl-4-piperidyloxy)ethane], and an amide group-containing piperidine derivative [for example, a carbamoyloxypiperidine such as 4-(phenylcarbamoyloxy)-2,2,6,6-tetramethylpiperidine; an alkylenedioxy-bis piperidine substituted with a carbamoyloxy group, e.g., bis(2,2,6,6-tetramethyl-4-piperidyl)hexamethylene-1, 6-dicarbamate]. Moreover, the hindered amine-series compound may also include, for example, a polycondensate of piperidine derivatives having a high molecular weight (e.g., a polycondensate of dimethyl succinate and 1-(2-hydroxyethyl)-4-hydroxy-2,2,6,6-tetramethylpiperidine, and a poly (6-[(1,1,3,3-tetramethylbutyl)imino-1,3,5-triazin-2,4-diyl] [2-(2,2,6,6-tetramethylpiperidyl)amino]hexamethylene[4-(2,2,6,6-tetramethylpiperidyl)imino])). These hindered amine-series compounds maybe used singly or in combination.

These antioxidants may be used singly or in combination. The proportion of the antioxidant maybe about 0.001 to 5 parts by weight, preferably about 0.005 to 3 parts by weight, and more preferably about 0.01 to 2 parts by weight, relative to 100 parts by weight of the polyacetal resin.

(Processing Stabilizer)

The processing stabilizer may include at least one member selected from the group consisting of (a) a long-chain fatty acid or a derivative thereof, (b) a polyoxyalkylene glycol, (c) a silicone compound, and others.

(a) Long-chain or higher fatty acid or derivative thereof

The long-chain or higher fatty acid may be a saturated fatty acid or an unsaturated fatty acid. Moreover, part of hydrogen atoms in the higher fatty acid may be substituted with a substituent(s) such as hydroxyl group. Such a higher fatty acid may be exemplified by a mono- or di-fatty acid having not less than 10 carbon atoms, for example, a saturated mono-fatty acid having not less than 10 carbon atoms [e.g., a saturated $C_{10-34}$ fatty acid (preferably a saturated $C_{10-30}$ fatty acid) such as capric acid, lauric acid, myristic acid, pentadecylic acid, palmitic acid, stearic acid, arachic acid, behenic acid or montanic acid], an unsaturated mono-fatty acid having not less than 10 carbon atoms [e.g., an unsaturated $C_{10-34}$ fatty acid (preferably an unsaturated $C_{10-30}$ fatty acid) such as oleic acid, linoleic acid, linolenic acid, arachidonic acid or erucic acid], a di-fatty acid having not less than 10 carbon atoms (a dibasic fatty acid) [e.g., a saturated $C_{10-30}$ di-fatty acid (preferably a saturated $C_{10-26}$ di-fatty acid) such as sebacic acid, dodecanedioic acid, tetradecanedioic acid or thapsiaic acid (or thapsic acid), and an unsaturated $C_{10-30}$ di-fatty acid (preferably an unsaturated $C_{10-26}$ di-fatty acid) such as decenedioic acid or dodecenedioic acid], and others. The fatty acid may also include one which has one or a plurality of hydroxyl group(s) in a molecular thereof (e.g. , a hydroxy-saturated $C_{10-26}$ fatty acid such as 12-hydroxy stearic acid). These fatty acids may be used singly or in combination. Among these fatty acids, a saturated or unsaturated $C_{10-26}$ mono-fatty acid, and a saturated or unsaturated $C_{10-20}$ di-fatty acid are preferred.

The derivative of the higher fatty acid may include a fatty acid ester, a fatty acid amide, and others. As to the fatty acid ester, there is no particular limitation on its structure, and an ester of either a straight or branched chain fatty acid can be used. As the higher fatty acid ester, there may be mentioned, for example, an ester of the above-mentioned higher fatty acid with an alcohol (e.g., an ester having one or a plurality of ester bond(s), such as a monoester, a diester, a triester, or a tetraester). The alcohol constituting the higher fatty acid ester is not particularly limited to a specific one. Such an alcohol may be a monohydric alcohol. As such an alcohol, a polyhydric alcohol is usually employed in many cases.

The polyhydric alcohol may include a polyhydric alcohol having about 2 to 8 carbon atoms (preferably, about 2 to 6 carbon atoms) or a polymer thereof, for example, a diol exemplified by an alkylene glycol [e.g., a $C_{2-8}$alkylene glycol (preferably a $C_{2-6}$alkylene glycol) such as ethylene glycol, diethylene glycol or propylene glycol]; a triol exemplified by glycerin, trimethylolpropane, or a derivative thereof; a tetraol exemplified by pentaerythritol, sorbitan, or a derivative thereof, as well as a homo- or copolymer of the polyhydric alcohol(s) [e.g., a homo- or copolymer of an alkylene glycol such as a polyethylene glycol or a polypropylene glycol, a polyglycerin, dipentaerythritol, and a polypentaerythritol]. The average degree of polymerization of the polyoxyalkylene glycol is not less than 2 (e.g., about 2 to 500), preferably about 2 to 400 (e.g., about 2 to 360), and more preferably not less than 16 (e.g., about 20 to 200). Incidentally, in the case of using the polyoxyalkylene glycol as a polyhydric alcohol, it is preferred to use, as a long-chain (or higher) fatty acid constituting the ester, a fatty acid having not less than 12 carbon atoms, for example, a saturated or unsaturated $C_{12-26}$mono-fatty acid, and a saturated or unsaturated $C_{12-20}$ di-fatty acid. The alcohols may be used singly or in combination.

Examples of such an ester of a long-chain or higher fatty acid may include ethylene glycol mono- or dipalmitate, ethylene glycol mono- or distearate, ethylene glycol mono- or dibehenate, ethylene glycol mono- or dimontanate, glycerin mono- to tripalmitate, glycerin mono- to tristearate, glycerin mono- to tribehenate, glycerin mono- to trimontanate, pentaerythritol mono- to tetrapalmitate, pentaerythritol mono- to tetrastearate, pentaerythritol mono- to tetrabehenate, pentaerythritol mono- to tetramontanate, a polyglycerin tristearate, trimethylolpropane monopalmitate, pentaerythritol monoundecylate, sorbitanmonostearate, a mono- ordilaurate of a polyalkylene glycol (such as a polyethylene glycol or a polypropylene glycol), a mono- or dipalmitate of the polyalkylene glycol, a mono- or distearate of the polyalkylene glycol, a mono- or dibehenate of the polyalkylene glycol, a mono- or dimontanate of the polyalkylene glycol, a mono- or dioleate of the polyalkylene glycol, and a mono- or dilinolate of the polyalkylene glycol.

Among these derivatives, as the fatty acid amide, an acid amide (e.g., a monoamide and a bisamide) of the higher fatty acid (a higher mono- or di-fatty acid) with an amine (such as a monoamine, a diamine or a polyamine) may be used. Among the acid amides, a bisamide is particularly preferred.

As the monoamide, there may be mentioned, for example, a primary acid amide of a saturated fatty acid (such as capric acid amide, lauric acid amide, myristic acid amide, palmitic acid amide, stearic acid amide, arachic acid amide, behenic acid amide or montanic acid amide); a primary acid amide of an unsaturated fatty acid (such as oleic acid amide); and a secondary acid amide of a saturated and/or an unsaturated fatty acid with a monoamine (such as stearyl stearic acid amide or stearyl oleic acid amide).

The bisamide may include a bisamide of the fatty acid with a $C_{1-6}$alkylenediamine (particularly, a $C_{1-2}$alkylenediamine). The concrete examples of the bisamide may include ethylenediamine-dipalmitic acid amide, ethylenediamine-distearic acid amide (ethylene bis-stearyl amide), hexamethylenediamine-distearic acid amide, ethylenediamine-dibehenic acid amide, ethylenediamine-dimontanic acid amide, ethylenediamine-dioleic acid amide, and ethylenediamine-dierucic acid amide. Furthermore, a bisamide in which different species of acyl groups are independently bonded to amine sites of an alkylenediamine, such as ethylenediamine-(stearic acid amide)oleic acid amide, may also be used. In the acid amide, it is preferred that the fatty acid constituting the acid amide is a saturated fatty acid.

These long-chain (or higher) fatty acid amides or derivatives thereof may be used singly or in combination.

(b) Polyoxyalkylene Glycol

The polyoxyalkylene glycol may include a homo- or copolymer of an alkylene glycol [e.g., a $C_{2-6}$alkylene glycol such as ethylene glycol, propylene glycol, or tetramethylene glycol (preferably a $C_{2-4}$alkyleneglycol)], and a derivative thereof.

Specific examples of the polyoxyalkylene glycol may include a poly$C_{2-6}$oxyalkylene glycol such as a polyethylene glycol, a polypropylene glycol or a polytetramethylene glycol (preferably a poly$C_{2-4}$oxyalkylene glycol), a copolymer such as a polyoxyethylene-polyoxypropylene copolymer (e.g., a random or block copolymer), a polyoxyethylene-polyoxypropylene glyceryl ether, or a polyoxyethylene-polyoxypropylene monobutyl ether, and others. Among them, the preferred one includes a polymer having an oxyethylene unit, for example, a polyethylene glycol, a polyoxyethylene-polyoxypropylene copolymer, and a derivative thereof.

The number average molecular weight of the polyoxyalkylene glycol is about $3\times10^2$ to $1\times10^6$ (e.g., about $5\times10^2$ to $5\times10^5$), and preferably about $1\times10^3$ to $1\times10^5$ (e.g., about $1\times10^3$ to $5\times10^4$). The polyoxyalkylene glycols may be used singly or in combination.

(c) Silicone Compound

The silicone compound (or silicone-series compound) may include a (poly)organosiloxane, and others. Examples of the (poly)organosiloxane may include, a monoorganosiloxane such as a dialkylsiloxane (e.g., dimethylsiloxane), an alkylarylsiloxane (e.g., phenylmethylsiloxane) or a diarylsiloxane (e.g., diphenylsiloxane), a homopolymer thereof (for example, a polydimethylsiloxane, and a polymethylphenylsiloxane), or a copolymer thereof. Incidentally, the polyorganosiloxane may be an oligomer.

Moreover, the (poly)organosiloxane may include a modified (poly)organosiloxane (e.g., a modified silicone) having substituent(s) (such as an epoxy group, a hydroxyl group, an alkoxy group, a carboxyl group, an amino group or a substituted amino group (e.g., a dialkylamino group), an ether group, a vinyl group, or a (meth)acryloyl group) in the end or main chain of the molecule. These silicone-series compounds may be used singly or in combination.

The proportion of the processing stabilizer may be selected from, for example, about 0.001 to 10 parts by weight, preferably about 0.01 to 5 parts by weight, and more preferably about 0.03 to 3 parts by weight, relative to 100 parts by weight of the polyacetal resin. In particular, the proportion may be about 0.03 to 2 parts by weight.

(Heat Stabilizer)

The heat stabilizer may include (a) a basic nitrogen-containing compound, (b) an organic carboxylic acid or a metal salt of an organic carboxylic acid, (c) an alkali or alkaline earth metal compound, (d) a hydrotalcite, (e) a zeolite, (f) a phosphine compound, and others.

(a) Basic Nitrogen-Containing Compound

As the basic nitrogen-containing compound (or basic nitrogen compound), at least one member selected from the group consisting of an aminotriazine compound, a guanidine compound, a urea compound, an amino acid compound, an amino alcohol compound, an imide compound, an amide compound, and a hydrazine compound may be used.

The aminotriazine compound may include melamine or a derivative thereof [e.g., melamine, and a condensate of melamine (melam, melem, melon)], guanamine or a derivative thereof, and an aminotriazine resin [for example, a co-polycondensation resin of melamine (e.g., a melamine-formaldehyde resin, a phenol-melamine resin, a melamine-phenol-formaldehyde resin, a benzoguanamine-melamine resin, and an aromatic polyamine-melamine resin), and a co-polycondensation resin of guanamine (e.g., a benzoguanamine-formaldehyde resin, and a benzoguanamine-phenol-formaldehyde resin)].

Among the aminotriazine compounds, the derivative of guanamine may include an aliphatic guanamine compound [for example, a monoguanamine (e.g., a $C_{1-24}$alkyl-substituted guanamine such as valeroguanamine, caproguanamine, heptanoguanamine, caprylguanamine, or stearoguanamine), and an alkylenebisguanamine (e.g., a $C_{1-24}$alkylenebisguanamine such as succinoguanamine, glutaroguanamine, adipoguanamine, pimeloguanamine, suberoguanamine, azeloguanamine, or sebacoguanamine)], an alicyclic guanamine-series compound [for example, a monoguanamine (e.g., cyclohexanecarboguanamine, norbornenecarboguanamine, cyclohexenecarboguanamine, norbornanecarboguanamine, and a compound obtained by introducing a functional group thereto (e.g., a derivative whose cycloalkane residue has one to three functional group(s) as a substituent, such as an alkyl group, a hydroxy group, an amino group, an acetoamino group, a nitryl group, a carboxyl group, an alkoxycarbonyl group, a carbamoyl group, an alkoxy group, a phenyl group, a cumyl group or a hydroxyphenyl group))], an aromatic guanamine-series compound [for example, a monoguanamine (e.g., benzoguanamine and a compound obtained by introducing a functional group thereto (e.g., a benzoguanamine derivative whose phenyl residue has one to five functional group(s) as a substituent, such as an alkyl group, an aryl group, a hydroxyl group, an amino group, an acetoamino group, a nitryl group, a carboxyl group, an alkoxycarbonyl group, a carbamoyl group, an alkoxy group, a phenyl group, a cumyl group, or a hydroxyphenyl group: for example, o-, m- or p-toluguanamine, o-, m- or p-xyloguanamine, o-, m- or p-phenylbenzoguanamine, o-, m- or p-hydroxybenzoguanamine, 4-(4'-hydroxyphenyl)benzoguanamine, o-, m- or p-nitrylbenzoguanamine, 3,5-dimethyl-4-hydroxybenzoguanamine, and 3,5-di-t-butyl-4-hydroxybenzoguanamine), α- or β-naphthoguanamine and a derivative obtained by introducing a functional group thereto, a polyguanamine (e.g., phthaloguanamine, isophthaloguanamine, terephthaloguanamine, naphthalenediguanamine, and biphenylenediguanamine), and an aralkyl- or aralkyleneguanamine (e.g., phenylacetoguanamine, β-phenylpropioguanamine, and o-, m- or p-xylylenebisguanamine))], a hetero atom-containing guanamine-series compound [for example, an acetal group-containing guanamine (e.g., 2,4-diamino-6-(3,3-dimethoxypropyl-s-triazine), a dioxane ring-containing guanamine (e.g., [2-(4',6'-diamino-s-triazin-2'-yl)ethyl]-1,3-dioxane, [2-(4', 6'-diamino-s-triazin-2'-yl)ethyl]-4-ethyl-4-hydroxymethyl-1,3-dioxane), a tetraoxospiro ring-containing guanamine (e.g., CTU-guanamine, and CMTU-guanamine), an isocyanuric ring-containing guanamine (e.g., 1,3,5-tris[2-(4',6'-diamino-s-triazin-2'-yl)ethyl]isocyanurate, and 1,3,5-tris[3-(4', 6'-diamino-s-triazin-2'-yl)propyl]isocyanurate), an imidazole ring-containing guanamine (e.g., guanamine compounds described in Japanese Patent Application Laid-Open No. 41120/1972 (JP-47-41120A)), and guanamine compounds described in Japanese Patent Application Laid-Open No. 154181/2000 (JP-2000-154181A)). Moreover, the aminotriazine compound may also include, for example, a compound which has an alkoxymethyl group(s) on amino group(s) of the melamine, melamine derivative or guanamine-series compound [e.g., a mono- to hexamethoxymethylmelamine, a mono- to tetramethoxymethylbenzoguanamine, and a mono to octamethoxymethyl-CTU-guanamine].

The guanidine compound may include, for example, a non-cyclic guanidine (e.g., glycocyamine, guanolin, guanidine, and cyanoguanidine), a cyclic guanidine (e.g., a glycocyamidine compound such as glycocyamidine, or creatinine; and oxalylguanidine or a cyclic guanidine having a similar structure thereto, such as oxalylguanidine or 2,4-diiminoparabanic acid); an imino group-substituted urazole compound (e.g., iminourazole, and guanazine); an isocyanuric acid imide (e.g., isoammelide, and isoammeline); malonylguanidine, tartronylguanidine; mesoxalylguanidine; and others.

The urea compound may include, for example, a non-cyclic urea compound [for example, urea, an N-substituted urea having a substituent such as an alkyl group, a non-cyclic urea condensate (e.g., a polymer of urea, such as biuret, or biurea; and a condensate compound of urea and an aldehyde compound, such as methylenediurea or urea form, and an oligo- or poly$C_{1-12}$alkyleneurea (e.g., an oligo- or polynonamethyleneurea))], a cyclic urea compound [for example, a cyclic monoureide, e.g., a $C_{1-10}$alkyleneurea (e.g., ethyleneurea, and crotonylideneurea), an aryleneurea (e.g., imesatin), a ureide of a dicarboxylic acid (e.g., parabanic acid, barbituric acid, isocyanuric acid, and uramil), a ureide of a β-aldehydic acid (e.g., uracil, thymine, and urazole), a ureide of an α-hydroxy acid (for example, a hydantoin compound, e.g., hydantoin; a 5-straight or branched chain $C_{1-6}$alkyl-hydantoin such as 5-methylhydantoin; a 5-$C_{6-10}$arylhydantoin which may have a substituent (such as a hydroxyl group or an amino group) on an aryl group thereof, such as 5-phenylhydantoin, 5-(o-, m-, or p-hydroxyphenyl) hydantoin, or 5-(o-, m-, or p-aminophenyl)hydantoin; a 5-$C_{6-10}$aryl$C_{1-4}$alkyl-hydantoin such as 5-benzylhydantoin; a 5,5-di-straight or branched chain $C_{1-6}$alkyl-hydantoin such as 5,5-dimethylhydantoin; a 5-straight or branched chain $C_{1-6}$alkyl-5-$C_{6-10}$arylhydantoin such as 5-methyl-5-phenyl-hydantoin; a 5,5-di$C_{6-10}$arylhydantoin such as 5,5-diphenyl-hydantoin; a 5,5-bis($C_{6-10}$aryl$C_{1-4}$alkyl)hydantoin such as 5,5-dibenzylhydantoin; a $C_{1-10}$alkylene-bishydantoin such as pentamethylenebishydantoin; allantoin or a metal salt thereof (e.g., an Al salt such as allantoin dihydroxyaluminum salt)); and a cyclic diureide, for example, uric acid, an alkyl-substituted uric acid, acetyleneurea (glycoluril) or a derivative thereof (e.g. a mono- to tetra($C_{1-4}$alkoxy$C_{1-4}$alkyl)glycoluril), crotylidenediurea, a diureide of an a-hydroxy acid (e.g., 1,1-methylenebis(5,5-dimethylhydantoin)), a diurea such as p-urazine, and a diureide of a dicarboxylic acid (e.g., alloxantin, and purpuric acid)].

Examples of the amino acid may include an α-amino acid [for example, a monoaminomonocarboxylic acid (e.g., glycine, alanine, valin, norvalin, leucine, norleucine, isoleucine, phenylalanine, tyrosine, diiodotyrosine, surinamine, threonine, serine, proline, hydroxyproline, tryptophan, methionine, cystine, cysteine, citrulline, α-aminobutyric acid, hexahydropicolinic acid, teanine, and o- or m-tyrosine), a monoaminodicarboxylic acid (e.g., aspartic acid, glutamic acid, asparagine, glutamine, hexahydrodipicolinic acid, and hexahydroquinolinic acid), and a diaminomonocarboxylic acid (e.g., lysine, hydroxylysine, arginine, and histidine)], a β-amino acid (e.g., β-alanine, β-aminobutyric acid, and hexahydrocinchomeronic acid), a γ-amino acid (e.g., γ-aminobutyric acid), a δ-amino acid (e.g., δ-amino-n-valeric acid), and others. Incidentally, these amino acids may be in a D-, L-, or DL-form. The amino acid may also include an amino acid derivative in which a carboxyl group(s) is (are) subjected to metal salination (e.g., an alkali metal salt, an alkaline earth metal salt), amidation, hydrazidation, or esterification (e.g., methyl esterification, ethyl esterification).

The amino alcohol compound may include an amino $C_{1-10}$aliphatic mono- or polyol such as monoethanolamine, diethanolamine, 2-amino-1-butanol, 2-amino-2-methyl-1-propanol, 2-amino-2-methyl-1,3-propanediol, 2-amino-2-ethyl-1,3-propanediol, or tris(hydroxymethyl)aminomethane.

Examples of the imide compound may include an aromatic polycarboxylic acid imide such as phthalic acid imide, trimellitic acid imide, or pyromellitic acid imide, and others.

The amide compound may include, for example, an aliphatic carboxylic acid amide (e.g., malonamide, adipic acid amide, sebacic acid amide, and dodecanedioic acid amide), acycliccarboxylicacidamide (e.g., ε-caprolactam), an aromatic carboxylic acid amide (e.g., benzoic acid amide, o-, m- or p-aminobenzamide, isophthalic acid diamide, and terephthalic acid amide), a polyamide-series resin [for example, a nylon 3 (a poly-β-alanine), a nylon 46, a nylon 6, a nylon 66, a nylon 11, a nylon 12, a nylon MXD6, a nylon 6-10, a nylon 6-11, a nylon 6-12, a nylon 6-66-610, and a nylon 9T], a polyester amide, a polyamide imide, a polyurethane, a homo- or copolymer of a poly(meth)acrylic acid amide which may be crosslinked [e.g., polymers described in U.S. Pat. No. 5,011,890], a homo- or copolymer of a poly(vinyllactam) [for example, a homo- or copolymer of a poly(N-vinylpyrrolidone) (e.g., homo- or copolymers described in Japanese Patent Application Laid-Open No. 52338/1980 (JP-55-52338A), and US Patent No. 3204014)], a poly(N-vinylcarboxylic acid amide), a copolymer of N-vinylcarboxylic acid amide and other vinyl monomer (e.g., homo- or copolymers described in Japanese Patent Application Laid-Open Nos. 247745/2001 (JP-2001-247745A), 131386/2001 (JP-2001-131386A), 311302/1996 (JP-8-311302A) and 86614/1984 (JP-59-86614A), U.S. Pat. Nos. 5,455,042, 5,407,996 and 5,338,815), and others.

Although the hydrazine compound includes a carboxylic acid hydrazide, this carboxylic acid hydrazide is different from the above-mentioned hetero atom-containing aliphatic carboxylic acid hydrazides and substantially does not contain the hetero atom in a carboxylic acid constituting the carboxylic acid hydrazide. Such a hydrazine compound may include, for example, a fatty acid hydrazide (e.g., lauric acid hydrazide, stearic acid hydrazide, adipic acid dihydrazide, sebacic acid dihydrazide, and dodecanedioic acid dihydrazide), and an aromatic carboxylic acid hydrazide (e.g., benzoic acid hydrazide, naphthoic acid hydrazide, phthalic acid dihydrazide, isophthalic acid dihydrazide, terephthalic acid dihydrazide, naphthalenedicarboxylic acid dihydrazide, p-hydroxybenzoic acid hydrazide, and salicylic acid hydrazide).

(b) Organic Carboxylic Acid or Metal Salt of Organic Carboxylic Acid

As the organic carboxylic acid, a carboxyl group-containing compound having a pKa of not less than 3.6 maybe used. Such an organic carboxylic acid may include, for example, organic carboxylic acids described in Japanese Patent Application Laid-Open No. 239484/2000 (JP-2000-239484A).

The metal salt of the organic carboxylic acid may include a salt of an organic carboxylic acid with a metal (e.g., an alkali metal such as Li, Na or K; an alkaline earth metal such as Mg or Ca; and a transition metal such as Zn).

The organic carboxylic acid constituting the metal salt may be a compound of low molecular weight or a compound of high molecular weight. As the organic carboxylic acid, there may be used a saturated or unsaturated lower aliphatic carboxylic acid having less than 10 carbon atoms, and a polymer of an unsaturated aliphatic carboxylic acid, in addition to a saturated or unsaturated higher aliphatic carboxylic acid exemplified in the paragraph of the higher fatty acid. Moreover, these aliphatic carboxylic acids may have a hydroxyl group. The saturated lower aliphatic carboxylic acid may include a saturated $C_{1-9}$monocarboxylic acid (e.g., acetic acid, propionic acid, butyric acid, isobutyric acid, valeric acid, isovaleric acid, pivalic acid, caproic acid, and caprylic acid), a saturated $C_{2-9}$dicarboxylic acid (e.g., oxalic acid, malonic acid, succinic acid, glutaric acid, adipic acid, pimelic acid, cork acid, and azelaic acid), and a hydroxy acid thereof (e.g., glycolic acid, lactic acid, glyceric acid, hydroxybutyric acid, and citric acid).

The unsaturated lower aliphatic carboxylic acid may include, for example, an unsaturated $C_{3-9}$monocarboxylic acid [e.g., (meth)acrylic acid, crotonic acid, and isocrotonic acid], an unsaturated $C_{4-9}$dicarboxylic acid (e.g., maleic acid, and fumaric acid), and a hydroxy acid thereof (e.g., propiolic acid).

Moreover, exemplified as the polymer of the unsaturated aliphatic carboxylic acid may be a copolymer of a polymerizable unsaturated carboxylic acid [for example, an α,β-ethylene-type (ethylenic) unsaturated carboxylic acid, for example, a polymerizable unsaturated monocarboxylic acid (such as (meth)acrylic acid), a polymerizable unsaturated polycarboxylic acid (such as itaconic acid, maleic acid, or fumaric acid), an acid anhydride of the polycarboxylic acid, or a monoester of the polycarboxylic acid (e.g., a mono $C_{1-10}$alkyl ester of the polycarboxylic acid such as monoethyl maleate)] with an olefin (e.g., an α-$C_{2-10}$olefin such as ethylene or propylene).

These organic carboxylic acids or metal salts of the organic carboxylic acids may be used singly or in combination.

The preferred metal salt of the organic carboxylic acid may include a salt of an organic carboxylic acid with an alkali metal (e.g., lithium citrate, potassium citrate, sodium citrate, lithium stearate, and lithium 12-hydroxystearate), a salt of an organic carboxylic acid with an alkaline earth metal (e.g., magnesium acetate, calcium acetate, magnesium citrate, calcium citrate, calcium stearate, magnesium stearate, magnesium 12-hydroxystearate, and calcium 12-hydroxystearate), an ionomer resin (a resin in which at least a part of carboxyl groups contained in the copolymer of the polymerizable unsaturated polycarboxylic acid with the olefin is neutralized with an ion of the metal, and others. The ionomer resin is, for example, commercially available as ACLYN (manufactured by Allied Signal Inc.), Himilan (manufactured by Du Pont-Mitsui Polychemicals Co., Ltd.), Surlyn (manufactured by Du Pont), and others.

Among the metal salts, in view of stabilizing effects, a salt with an alkaline earth metal such as calcium citrate, magnesium citrate, magnesium stearate, calcium stearate, magnesium 12-hydroxystearate, or calcium 12-hydroxystearate is preferred. In particular, a salt of a hydroxy acid with an alkaline earth metal, such as calcium citrate or magnesium citrate, is preferred.

(c) Alkali or Alkaline Earth Metal Compound

The alkali or alkaline earth metal compound may include an inorganic compound exemplified by a metal oxide (such as CaO, or MgO), a metal hydroxide (such as LiOH, Ca(OH)$_2$, or Mg(OH)$_2$), and a salt of an inorganic acid with a metal [e.g., a salt of an inorganic acid (such as a salt of carbonic acid with a metal (such as Li$_2$CO$_3$, Na$_2$CO$_3$, K$_2$CO$_3$, CaCO$_3$ or MgCO$_3$), a borate, and a phosphate)]. In particular, the metal oxide and the metal hydroxide are preferred. Moreover, among the compounds, the alkaline earth metal compound is preferred.

These alkali or alkaline earth metal compounds may be used singly or in combination.

(d) Hydrotalcite

As the hydrotalcite, hydrotalcites recited in Japanese Patent Application Laid-Open No. 1241/1985 (JP-60-1241A) and Japanese Patent Application Laid-Open No. 59475/1997 (JP-9-59475A), such as hydrotalcite compounds represented by the following formula are usable.

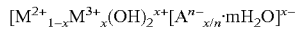

In the formula, M$^{2+}$ represents Mg$^{2+}$, Mn$^{2+}$, Fe$^{2+}$, Co$^{2+}$, or any of other divalent metal ions; M represents Al$^{3+}$, Fe$^{3+}$, Cr$^{3+}$, or any of other trivalent metal ions; A$^{n-}$ represents CO$_3^{2-}$, OH$^-$ HPO$_4^{2-}$, SO$_4^{2-}$, or any of other n-valent anions (particularly, monovalent or divalent anion); x is 0<x<0.5; and m is 0≦m<1.

These hydrotalcites may be used singly or in combination.

Incidentally, the hydrotalcite is available from Kyowa Chemical Industry Co., Ltd. under the trade name "DHT-4A", "DHT-4A-2", or "Alcamizer".

(e) Zeolite

The zeolite is not particularly limited to a specific one, and a zeolite other than H-type zeolite can be employed, for example, zeolites recited in Japanese Patent Application Laid-Open No. 62142/1995 (JP-7-62142A) [zeolites the smallest unit cell of which is a crystalline aluminosilicate with an alkaline and/or alkaline earth metal (A-, X—, Y—, L-, and ZSM-type zeolites, mordenite-type zeolite; chabazite, mordenite, faujasite, and other natural zeolites)].

These zeolites may be used singly or in combination.

Incidentally, A-type zeolite is available as "ZEOLAM-series (A-3, A-4, A-5)", "ZEOSTAR-series (KA-100P, NA-100P, CA-100P)" or others, X-type zeolite as "ZEOLAM-series (F-9)", "ZEOSTAR-series (NX-100P)" or others, and Y-type zeolite as "HSZ-series (320NAA)" or others, from Tosoh Corp. or Nippon Chemical Industrial Co., Ltd.

(f) Phosphine Compound

Examples of the phosphine compound may include a phosphine compound such as an alkylphosphine (for example, a tri$C_{1-10}$alkylphosphine such as triethylphosphine, tripropylphosphine, or tributylphosphine), a cycloalkylphosphine (for example, a tri$C_{5-12}$cycloalkylphosphine such as tricyclohexylphosphine), an arylphosphine (for example, a tri $C_{6-12}$arylphosphine which may have a substituent (such as an amino group or a $C_{1-4}$alkyl group), such as triphenylphosphine, p-tolyldiphenylphosphine, di-p-tolylphenylphosphine, tri-m-aminophenylphosphine, tri(2,4-dimethylphenyl)phosphine, tri(2,4,6-trimethylphenyl)phosphine, or tri (o-, m- or p-tolyl)phosphine), an aralkylphosphine (for example, a tri($C_{6-12}$aryl$C_{1-4}$alkyl)phosphine such as tri(o-, m- or p-anisylphosphine), an arylalkenylphosphine (for example, a mono- or di$C_{6-12}$aryl-di- or mono$C_{2-10}$alkenylphosphine such as diphenylvinylphosphine, or allyldiphenylphosphine), an arylaralkylphosphine (for example, a mono- or di$C_{6-12}$aryl-di- or mono($C_{6-12}$aryl$C_{1-4}$alkyl)phosphine such as p-anisyldiphenylphosphine, or di(p-anisyl)phenylphosphine; and a $C_{6-12}$aryl-($C_{6-12}$aryl$C_{1-4}$alkyl)phosphine which may have a substituent (such as a $C_{1-10}$alkyl group), such as methylphenyl-p-anisylphosphine), or a bisphosphine compound [for example, a bis(di$C_{6-12}$arylphosphino)$C_{1-10}$alkane such as 1,4-bis(diphenylphosphino)butane], and others. These phosphine compounds may be used singly or in combination.

These heat stabilizers may be used singly or in combination. In particular, in the case of using the basic nitrogen-containing compound in combination with at least one member selected from the group consisting of the metal salt of an organic carboxylic acid, the alkali or alkaline earth metal compound, the hydrotalcite, the zeolite, and the phosphine compound, heat stability can be also imparted to the resin composition at a smaller amount of the heat stabilizer. Incidentally, the resin composition of the present invention can also improve heat stability without substantially containing a phosphorus-containing flame retardant.

In the case where the resin composition contains the heat stabilizer, the proportion of the heat stabilizer may be, for example, selected from the range of about 0.001 to 10 parts by weight, and preferably about 0.001 to 5 parts by weight (particularly about 0.01 to 2 parts by weight), relative to 100 parts by weight of the polyacetal resin. Incidentally, among the heat stabilizers, the hydrazine compound (the fatty acid hydrazide and the aromatic carboxylic acid hydrazide) is preferably used at a small amount because there is a possibility that too large amount of such a hydrazine compound brings about bleeding out thereof from the polyacetal resin composition or deterioration in processing stability of the resin composition. The proportion of the hydrazine compound may be usually not more than 1 part by weight (e.g., about 0 to 1 part by weight), preferably about 0.001 to 1 part by weight, and more preferably about 0.005 to 0.8 part by weight (e.g., about 0.005 to 0.08 part by weight), relative to 100 parts by weight of the polyacetal resin.

(Weather (Light)-Resistant Stabilizer)

The weather (light)-resistant stabilizer may include (a) a benzotriazole compound, (b) a benzophenone compound, (c) an aromatic benzoate compound, (d) a cyanoacrylate compound, (e) an oxalic anilide compound, (f) a hydroxyaryl-1, 3,5-triazine compound, and (g) a hindered amine compound, and others.

(a) Benzotriazole Compound

Examples of the benzotriazole compound (or benzotriazole-series compound) may include abenzotriazole compound having an aryl group substituted with a hydroxyl group and a $C_{1-6}$alkyl group, such as 2-(2'-hydroxy-5'-methylphenyl)benzotriazole, 2-(2'-hydroxy-3',5'-di(t-butyl)phenyl)benzotriazole, 2-(2'-hydroxy-3',5'-di(t-amyl)phenyl)benzotriazole or 2-(2'-hydroxy-3',5'-di-isoamylphenyl)benzotriazole; a benzotriazole compound having an aryl group substituted with a hydroxyl group and an aralkyl (or aryl) group, such as 2-[2'-hydroxy-3',5'-bis(α,α-dimethylbenzyl)phenyl]benzotriazole; a benzotriazole compound having an aryl group substituted with a hydroxyl group and an alkoxy (e.g., a $C_{1-12}$alkoxy) group, such as 2-(2'-hydroxy-4'-octoxyphenyl) benzotriazole; and others.

Among these benzotriazole-series compounds, the particularly preferred one includes a benzotriazole compound having a C6-$_{10}$aryl (particularly, phenyl) group substituted with a hydroxyl group and a $C_{3-6}$alkyl group, as well as a benzotriazole compound having an aryl group substituted with a hydroxyl group and a $C_{6-10}$aryl-$C_{1-6}$alkyl (particularly, phenyl-$C_{1-4}$alkyl) group.

(b) Benzophenone Compound

Exemplified as the benzophenone compound (or benzophenone-series compound) may be a benzophenone compound having a plurality of hydroxyl groups (e.g., a di- to tetrahydroxybenzophenone such as 2,4-dihydroxybenzophenone; a benzophenone compound having a hydroxyl group, and an aryl or aralkyl group substituted with a hydroxyl group, such as 2-hydroxy-4-oxybenzylbenzophenone); a benzophenone compound having a hydroxyl group and an alkoxy (e.g., $C_{1-16}$alkoxy) group (e.g., 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, and 2-hydroxy-4-methoxy-5-sulfobenzophenone); and others.

Among these benzophenone-series compounds, the benzophenone-series compound preferably includes a benzophenone compound having a hydroxyl group, and a $C_{6-10}$aryl (or $C_{6-10}$aryl-$C_{1-4}$alkyl) group substituted with a hydroxyl group, particularly one having a hydroxyl group, and a phenyl-$C_{1-4}$alkyl group substituted with a hydroxyl group.

(c) Aromatic Benzoate Compound

The aromatic benzoate compound (or aromatic benzoate-series compound) may include an alkylarylsalicylate such as p-t-butylphenylsalicylate or p-octylphenylsalicylate (particularly, an alkylphenylsalicylate).

(d) Cyanoacrylate Compound

Exemplified as the cyanoacrylate compound (or cyanoacrylate-series compound) may be a cyano group-containing diarylacrylate such as 2-ethylhexyl-2-cyano-3,3-diphenylacrylate or ethyl-2-cyano-3,3-diphenylacrylate (particularly, a cyano group-containing diphenylacrylate).

(e) Oxalic Anilide Compound

The oxalic anilide compound (or oxalic anilide-series compound) may include,for example, an oxalic diamide compound having an aryl group (such as phenyl group) on a nitrogen atom in which the aryl group may have a substituent(s), exemplified by N-(2-ethylphenyl)-N'-(2-ethoxy-5-t-butylphenyl)oxalic diamide, and N-(2-ethylphenyl)-N'-(2-ethoxy-phenyl)oxalic diamide.

(f) Hydroxyaryl-1,3,5-triazine Compound

Examples of the hydroxyaryl-1,3,5-triazine compound (or hydroxyaryl-1,3,5-triazine-series compound) may include a 2,4-di$C_{6-10}$aryl-6-(mono- or dihydroxy$C_{6-10}$aryl)-1,3,5-triazine [for example, a 2,4-di$C_{6-10}$aryl-6-(mono- or dihydroxy$C_{6-10}$aryl)-1,3,5-triazine which may have a substituent(s) (such as a $C_{1-10}$alkyl group, a $C_{1-18}$alkoxy group, a $C_{1-10}$alkoxy$C_{1-10}$alkoxy group, a $C_{6-10}$aryloxy group, or a $C_{6-10}$aryl$C_{1-6}$alkoxy group) on an aryl group thereof, e.g., a hydroxyaryltriazine such as 2,4-diphenyl-6-(2-hydroxyphenyl)-1,3,5-triazine, or 2,4-diphenyl-6-(2,4-dihydroxyphenyl)-1,3,5-triazine; a hydroxyalkoxyaryltriazine such as 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-6-(2-hydroxy-4-propoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, or a 2,4-di(p-tolyl or 2',4'-dimethylphenyl)-6-(2-hydroxy-$C_{1-16}$alkoxyphenyl)-1,3,5-triazine corresponding to each of these 2,4-diphenyl-6-(2-hydroxy-alkoxyphenyl)-1,3,5-triazines; a hydroxyaralkyloxyaryltriazine such as 2,4-diphenyl-6-(2-hydroxy-4-benzyloxyphenyl)-1,3,5-triazine, or 2,4-di(p-tolyl or 2',4'-dimethylphenyl)-6-(2-hydroxy-4-benzyloxyphenyl)-1,3,5-triazine; a hydroxyalkoxyalkoxyaryltriazine such as 2,4-diphenyl-6-(2-hydroxy-4-(2-butoxyethoxy)phenyl)-1,3,5-triazine, or 2,4-di-p-tolyl-6-(2-hydroxy-4-(2-hexyloxyethoxy)phenyl)-1,3,5-triazine; and others. Among these compounds, one in which the aryl group is phenyl group, that is, the hydroxyphenyl-1,3,5-triazine-series compound, is preferred.

(g) Hindered Amine Compound

As the hindered amine compound (or hindered amine-series compound), the hindered amine compound as exemplified in the paragraph of the above-mentioned antioxidant may be used.

These weather (light)-resistant stabilizers may be used singly. The same or different species of the weather (light)-resistant stabilizers may be used in combination.

Incidentally, it is preferred to use the hindered amine-series compound (g) in combination with other weather (light)-resistant stabilizer. In particular, it is preferred to use the benzotriazole-series compound (a) in combination with the hindered amine-series compound (g). The proportion (weight ratio) of the hindered amine-series compound (g) relative to other weather (light)-resistant stabilizer(s) (particularly, the benzotriazole-series compound) [the hindered amine-series compound/other weather (light)-resistant stabilizer(s)] may be, for example, about 0/100 to 80/20, preferably about 10/90 to 70/30, and more preferably about 20/80 to 60/40.

The proportion of the weather (light)-resistant stabilizer is, for example, about 0 to 5 parts by weight (e.g., about 0.01 to 5 parts by weight), preferably about 0.1 to 4 parts by weight, and more preferably about 0.1 to 2 parts by weight, relative to 100 parts by weight of the polyacetal resin.

(Coloring Agent)

As the coloring agent, various dyes or pigments may be used. As the dye, a solvent dye is preferred, and includes, for example, an azo-series dye, an anthraquinone-series dye, a phthalocyanine-series dye or a naphthoquinone-series dye. The pigment may be an inorganic pigment or an organic pigment.

Exemplified as the inorganic pigment may be a titanium-series (titanium-containing) pigment, a zinc-series (zinc-containing) pigment, a carbon black (e.g., a furnace black, a channel black, an acetylene black, and Ketjen black), an iron-series (iron-containing) pigment, a molybdenum-series (molybdenum-containing) pigment, a cadmium-series (cadmium-containing) pigment, a lead-series (lead-containing) pigment, a cobalt-series (cobalt-containing) pigment, and an aluminum-series (aluminum-containing) pigment.

The organic pigment may include an azo-series pigment, an anthraquinone-series pigment, a phthalocyanine-series pigment, a quinacridone-series pigment, a perylene-series pigment, a perinone-series pigment, an isoindoline-series pigment, adioxazine-series pigment, or a threne-series pigment.

The coloring agent maybe used singly, or a plurality of these coloring agents may be used in combination. The use of a coloring agent having a high light-shielding effect [such as a carbon black, a titanium white (a titanium oxide), a phthalocyanine-series pigment, a perylene-series pigment (particularly a carbon black, a perylene-series black pigment)] ensures improvement in weather (light)-resistance of the polyacetal resin composition.

The content of the coloring agent is, for example, about 0 to 5 parts by weight (e.g., about 0.01 to 5 parts by weight), preferably about 0.1 to 4 parts by weight, and more preferably about 0.1 to 2 parts by weight, relative to 100 parts by weight of the polyacetal resin.

To the polyacetal resin composition of the present invention may be optionally added a conventional additive(s) singly or in combination. The additive may include, for example, an antioxidant (e.g., a phosphorus-containing, a sulfur-containing, a hydroquinone-series, and a quinoline-series antioxidant), a specific carboxylic acid (e.g., carboxylic acids described in Japanese Patent Application Laid-Open No.239484/2000 (JP-2000-239484A)), an impact resistance improver [e.g., at least one member selected from the group consisting of a thermoplastic polyurethane-series resin, an acrylic core-shell polymer, a thermoplastic polyester-series elastomer, and a styrenic elastomer], a gloss control agent [e.g., at least one member selected from the group consisting of an acrylic resin (a homo- or copolymer of a $C_{1-10}$alkyl (meth)acrylate, e.g., a poly(methyl methacrylate)), and a styrenic resin (e.g., a homo- or copolymer of styrene)], an agent for improving sliding property (or a slide improver) [e.g., at least one member selected from the group consisting of an olefinic polymer, a silicone-series resin, and a fluorine-containing resin], a mold-release agent (releasing agent), a nucleating agent, an antistatic agent, a flame retardant, a foaming agent (or a blowing agent), a surfactant, an antibacterial agent, an antifungal agent, an aromatic agent, a perfume, various polymers [e.g., a polycarbonate-series resin, a polyolefinic elastomer or resin, a polyvinyl alcohol-series resin, and an aliphatic polyester-series resin (e.g., a poly(L-lactic acid), a poly(D-lactic acid), a poly(D/L-lactic acid), a polyglycolic acid, and a copolymer of glycolic acid and lactic acid (e.g., D-, L- or D/L-lactic acid))], a filler, and others.

Moreover, if necessary, the resin composition may be further blended with one or combination of a conventional filler (such as a fibrous, plate-like or particulate filler) to improve properties of the molded product of the present invention. Examples of the fibrous filler may include an inorganic fiber (e.g., a glass fiber, a carbon fiber, a boron fiber, and a potassium titanate fiber (whisker)), an organic fiber (e.g., an amide fiber), and others. As the plate-like filler, there may be mentioned a glass flake, a mica, a graphite, a variety of metal foil, and others. Examples of the particulate filler may include a metal oxide (e.g., zinc oxide, and alumina), a sulfate (e.g., calcium sulfate, and magnesium sulfate), a carbonate (e.g., calcium carbonate), a glass (e.g., a milled fiber, a glass bead, and a glass balloon), a silicate (e.g., a talc, a kaolin, a silica, a diatomite, a clay, and a wollastonite), a sulfide (e.g., molybdenum disulfide, and tungsten disulfide), a carbide (e.g., graphite fluoride, and silicon carbide), boron nitride, and others.

(Production Process of Polyacetal Resin Composition)

The polyacetal resin composition of the present invention may be a particulate mixture or a molten mixture, and it can be prepared by mixing a polyacetal resin with the specific hetero atom-containing aliphatic carboxylic acid hydrazide, and if necessary, other additive(s) [e.g., a stabilizer (an antioxidant, a processing stabilizer, a heat stabilizer, a weather (light)-resistant stabilizer), an impact resistance improver, a gloss control agent, a slide improver, a coloring agent and/or a filler], in a conventional manner. For example, (1) a process comprising feeding all components through a main feed port, kneading and extruding the resulting mixture into pellets with an extruder (e.g., a uniaxial or biaxial extruder), and molding a product from the pellets, (2) a process comprising feeding component(s) (e.g., a polyacetal resin, and the above-mentioned other additive(s)) free from the specific carboxylic acid hydrazide through a main feed port, feeding component(s) containing at least the specific carboxylic acid hydrazide (as other component(s), there may be mentioned a polyacetal resin, the above-mentioned other additive(s), or the like) through a side feed port, kneading and extruding the resulting mixture into pellets with an extruder, and molding a product from the pellets, (3) a process comprising feeding component(s) containing part of the specific carboxylic acid hydrazide (as other component(s), a polyacetal resin, other additive(s), or the like) through a main feed port and feeding component(s) containing the residual specific carboxylic acid hydrazide, and if necessary a carboxylic acid hydrazide as a heat stabilizer (as other component(s), a polyacetal resin, other additive(s), or others) through a side feed port, kneading and extruding the fed components by using an extruder to prepare pellets, and molding a product from the pellets; (4) once making pellets (master batch) different in formulation, mixing (diluting) the pellets in a certain ratio, and molding a product having a certain formulation from the resulting pellets, or (5) a process comprising allowing the specific carboxylic acid hydrazide to coexist with or adhere to a pelletized polyacetal resin by for example spraying or coating (e.g., surface-coating), and molding a product having a certain formulation from the resulting pellets is utilized.

Among these processes, the processes (1), (2) and (3) are preferred. In particular, it is preferred to melt-mix components by a uniaxial or biaxial extruder having exhaust (or degas) vent port(s) of not less than 1. Moreover, the carboxylic acid hydrazide may be side-fed through either of a feed port of the upstream or downstream of an exhaust vent port. Further, in the extruding and preparing step, the amount of formaldehyde emitted from the obtained shaped (or molded) article can be further reduced by a preparation method comprising preblending a processing auxiliary such as water and/or an alcohol (e.g., methanol, ethanol, isopropyl alcohol, and n-propyl alcohol) or infusing the processing auxiliary through a feed port of the upstream of an exhaust vent port, and exhausting and removing volatile component(s) containing water and/or the alcohol from the exhaust vent port. The amount of water and/or the alcohol to be added as the processing auxiliary is not particularly limited to a specific one. The amount of water and/or the alcohol may be usually selected from the range of about 0 to 20 parts by weight relative to 100 parts by weight of the polyacetal resin, and may be preferably about 0.01 to 10 parts by weight and more preferably 0.1 to 5 parts by weight relative to 100 parts by weight of the polyacetal resin.

Moreover, particularly, in the case of melt-mixing the polyacetal resin and the hetero atom-containing aliphatic carboxylic acid hydrazide by using an extruder, the hydrazide has a high formaldehyde-trapping rate, meanwhile limits a trapping amount of formaldehyde. Therefore, the preferably used method is an extruding and preparing method comprising side-feeding part or all of at least the hydrazide through a side feed port of the extruder, and/or an extruding and preparing method comprising setting up a melt-kneading or melt-mixing time (average residence time of the components) in the extruder as a short time, e.g., not longer than 300 seconds (e.g., about 5 to 300 seconds), preferably not longer than 250 seconds (e.g., about 10 to 250 seconds), more preferably not longer than 200 seconds (e.g., about 10 to 200 seconds), and particularly about 10 to 150 seconds.

Incidentally, in the preparation of a composition for use in a molded product, mixing of a powdered (particulate) polyacetal resin as a substrate (or base resin) (e.g., a powder (particulate) obtained by grinding or pulverizing part or all of the polyacetal resin) with other components (e.g., the specific carboxylic acid hydrazide, other additive(s) (e.g., a stabilizer, an impact resistance improver, a gloss control agent, a slide improver, a coloring agent and/or a filler) followed with melt-kneading improves the degree of dispersion of the additives and therefore is advantageous.

The polyacetal resin composition of the present invention realizes that the emission of formaldehyde due to oxidation or thermal decomposition or the like of the polyacetal resin is remarkably restrained or inhibited and that the working environment is improved or ameliorated particularly in the molding and processing (particularly, a melt-molding and processing) step. Moreover, deposition of decomposition products or additives on the mold (mold deposit), blooming or bleeding of such products or additives from a molded product can be remarkably restricted or inhibited, and various problems on the molding and processing step can be overcome.

(Molded Product)

The present invention also includes a molded product formed from the resin composition. The molded product contains the polyacetal resin and the hetero atom-containing aliphatic carboxylic acid hydrazide in combination, and has excellent stability in an extrusion and/or molding process with having extremely small amount of emission (or generation) of formaldehyde. In other words, molded products molded from the conventional polyacetal resins containing antioxidants and other stabilizers liberate relatively large amounts of formaldehyde, cause corrosion and discoloration, as well as pollute the living and working environment. For example, the formaldehyde emission from commercially available polyacetal resin articles is about 2 to 5 μg per one cm of surface area under dry conditions (in a constant-temperature dry atmosphere) and/or about 3 to 6 μg per one cm of surface area under humid conditions (in a constant-temperature moisture-laden atmosphere).

On the other hand, in the polyacetal resin molded product of the present invention, the amount of formaldehyde emission from the molded product can be effectively reduced by a smaller amount of the specific carboxylic acid hydrazide. Further, in the case of using the specific carboxylic acid hydrazide and the heat stabilizer (formaldehyde inhibitor) in combination, the amount of formaldehyde emission can be also inhibited to a large extent. Concretely, the amount of the formaldehyde emission is not more than 1.5 µg per one cm$^2$ of surface area of the molded product under dry conditions, preferably about 0 to 1.0 µg, more preferably about 0 to 0.6 µg, and usually about 0.001 to 1.0 µg, and further, about 0 to 0.1 µg is also achievable. Moreover, in humid conditions, the formaldehyde emission is not more than 2.5 µg (e.g., about 0 to 2 µg) per one cm$^2$ of surface area of the molded product, preferably about 0 to 1.2 µg, more preferably about 0 to 0.4 µg, and further, about 0 to 0.2 µg is also achievable. The amount in humid conditions may be usually about 0.001 to 1.2 µg.

The molded product of the present invention may have the above-mentioned formaldehyde emission under either dry conditions or humid conditions. In particular, the molded product shows the above formaldehyde emission level under both dry and humid conditions in many cases. Therefore, the molded product of the present invention can be used as a material which can be adapted to more severe environment.

Incidentally, the formaldehyde emission under dry conditions can be determined as follows.

After the molded product of polyacetal resin is cut if necessary and its surface area is measured, a suitable portion of the article (e.g., the amount equivalent to a surface area of about 10 to 50 cm$^2$) is placed in a sealable vessel (20 mL capacity) to seal and stand (or store) at a temperature of 80° C. for 24 hours. Then, this sealed vessel is charged with 5 mL of water and the formaldehyde in the aqueous solution is assayed in accordance with JIS (Japanese Industrial Standards) K0102, 29 (under the heading of Formaldehyde) to calculate the formaldehyde emission per unit surface area of the molded product (µg/cm$^2$).

The formaldehyde emission under humid conditions can be determined as follows.

After the molded product of a polyacetal resin is cut if necessary and its surface area is measured, a suitable portion of the molded product (e.g., the amount equivalent to a surface area of about 10 to 100 cm$^2$) is suspended from the lid of a sealable vessel (1 L capacity) containing 50 mL of distilled water. After seal of the vessel, the vessel is allowed to stand (or stored) in a constant temperature oven at 60° C. for 3 hours. Thereafter, the vessel is allowed to stand at a room temperature for 1 hour and the formaldehyde in the aqueous solution in the vessel is assayed in accordance with JIS K0102, 29 (under the heading of Formaldehyde) to calculate the formaldehyde emission per unit surface area of the article (µg/cm$^2$).

The above quantitative definition on formaldehyde emission in the present invention is adaptable as far as the polyacetal resin and the specific carboxylic acid hydrazide are contained, that is, the definition is adaptable not only for molded products molded from polyacetal resin compositions comprising the conventional additive(s) (e.g., a conventional stabilizer, and a mold-release agent), but also for molded products molded from comparable resin compositions containing an inorganic filler and/or other polymers, even if only a major part of the surface of the article (for example, 50 to 100% of the total surface area) is constituted by the polyacetal resin (for example, a multi-colored article or a coated article).

INDUSTRIAL APPLICABILITY

The resin composition of the present invention is useful for molding various molded products by a conventional molding (or shaping) method (for example, injection molding, extrusion molding, compression molding, blow molding, vacuum molding, foam molding, rotation molding, and gas injection molding).

Moreover, the molded product (or molded article) of the present invention finds application in any field of use where formaldehyde is objectionable (e.g., knob and lever as bicycle parts) and can also be used advantageously as parts and members in a variety of fields inclusive of automotive parts, electrical and electronic component (driving component and driven component) parts, architectural members and pipeline installation parts, household (for daily use) and cosmetic product parts, and medical device (for diagnostic or therapeutic use) parts.

More specifically, the automotive parts may include car interior parts such as inner handle, fuel trunk opener, seat belt buckle, assist lap, various switches, knob, lever, and clip; electrical system parts such as meters and connectors; in-vehicle electrical and electronic parts or mountings related to audio equipment and car navigation equipment, parts in contact with metals, typically the window regulator carrier plate, mechanical parts such as door lock actuator parts, mirror parts, wiper motor system parts, and fuel system parts.

The electrical or electronic component parts (the mechanical parts) may include, for example, parts or members constituted with molded products of a polyacetal resin and fitted with a number of metal contacts [e.g. audio equipment such as cassette tape recorder, video equipment such as video tape recorder (VTR), 8 mm or other video camera, etc., office automation (OA) equipment such as copying machines, facsimile, word processor, computer, toys actuated by the driving force of an electric motor or a spring, a telephone, a keyboard as an accessory to a computer or the like]. To be specific, there can be mentioned chassis (base), gear, lever, cam, pulley, and bearing. Furthermore, the electrical or electronic component parts are applicable to optical and magnetic recording medium parts at least partly made of a molded polyacetal resin (e.g. metal thin-film magnetic tape cassette, magnetic disk cartridge, opticomagnetic disc cartridge, etc.) and more particularly, the metal tape cassette for music, digital audio tape cassette, 8 mm video tape cassette, floppy (registered trademark) disk cartridge, minidisk cartridge, etc. As specific optical and magnetic medium parts, there can be mentioned tape cassette parts (tape cassette body, reel, hub, guide, roller, stopper, lid, etc.) and disk cartridge parts (disk cartridge body (case), shutter, cramping plate, etc.).

In addition, the molded product of a polyacetal resin according to the present invention can be used with advantage in architectural members and pipeline parts such as lighting equipment parts, interior architectural members (such as fittings, fixtures, furnishings), piping, cock, faucet, rest room (lavatory)-related parts, etc., a broad range of products related to daily living, cosmetic products, and medical devices, for example, fastener (such as slide fastener, snap fastener, hoop-and-loop fastener, rail fastener), stationery, chapstick or lipstick cases, washer (or washing machine), water cleaner, spray nozzle, spray device or container, aerosol container, general vessels, and syringe holder.

EXAMPLES

The following examples are intended to describe this invention in further detail and should by no means be interpreted as defining the scope of the invention.

Incidentally, referring to the examples and comparative examples, the moldability (the amount of the deposit on the mold), the amount of formaldehyde emission from the molded (or shaped) articles under dry and humid conditions, and the bleeding property were evaluated based on the following methods.

[Moldability (The Amount of the Deposit on the Mold)]

A pellet formed from a polyacetal resin composition was continuously or successively shaped or molded by using a 30 t injection molding machine (100 shots) to obtain a certain-molded product (20 mm in diameter and 1 mm in thickness), and the degree of the deposition on the mold was evaluated and classified into five grades. Incidentally, the larger the number of levels is, the lower or smaller the amount of the deposit on the mold (i.e., mold deposit) is.

[Amount of Formaldehyde Emission from Molded Product Under Dry Conditions]

Each resin sample consisting of 10 test pieces (one test piece: 2 mm×2 mm×50 mm; total-surface area: about 40 cm$^2$) was placed in a sealable vessel (capacity 20 mL) to seal and heated in a constant temperature oven at 80° C. for 24 hours. After air-cooling to room temperature, 5 mL of distilled water was injected into the vessel using a syringe. The formaldehyde content of this aqueous solution was determined in accordance with JIS K0102, 29 (under the heading of Formaldehyde) and the formaldehyde gas emission per surface area ($\mu g/cm^2$) was calculated.

[Amount of Formaldehyde Emission from Molded Product Under Humid Conditions, and the Bleeding Property]

Two plate test pieces (one piece: 100 mm×40 mm×2 mm; total surface area of 85.6 cm$^2$) were suspended from a lid of a polyethylene bottle (capacity 1 L) containing 50 ml of distilled water. The bottle was sealed to stand in a constant temperature oven at 60° C. for 3 hours, followed by standing for 1 hour at a room temperature. The formaldehyde content in the aqueous solution in the bottle was determined in accordance with JIS K0102, 29 (under the heading of Formaldehyde) and the formaldehyde gas emission per surface area of the article ($\mu g/cm^2$) was calculated.

Further, the surface of the plate test piece (molded product) after the test was visually observed, and the degree of the bleeding was evaluated based on the following criteria.

"A": No bleeding was observed.
"B": Slight bleeding was observed.
"C": Extremely heavy bleeding was observed.

Examples 1 to 22

To 100 parts by weight of a polyacetal resin copolymer were preblended (or premixed) a carboxylic acid hydrazide, an antioxidant, a processing stabilizer, a heat stabilizer, a coloring agent, and a weather (light) -resistant stabilizer in the proportions indicated in Tables 1 and 2. Concerning each of thus obtained mixtures, the mixture was supplied through a main feed port of a biaxial extruder (30 mm diameter) having one vent port, and melt-mixed to prepare a pelletized composition (extrusion condition: L/D=35, extrusion temperature=200° C., screw rotation frequency=100 rpm, vent vacuum=70 cmHg (93.1 kPa), discharging rate=15 kg/hr, and average residence time=100 seconds). From thus obtained pellets, prescribed test pieces were fabricated with an injection molding machine, and concerning each test piece, the moldability, the amount of formaldehyde emission from the test piece, and the bleeding property were evaluated. The results are shown in Tables 1 and 2.

Examples 23 to 25

To 95 parts by weight of a polyacetal resin copolymer were mixed an antioxidant, a processing stabilizer, a heat stabilizer, and a weather (light)-resistant stabilizer in the proportions indicated in Table 2 to prepare preblended materials. Concerning each of thus preblended materials, the preblended material was supplied through a main feed port of a biaxial extruder (30 mm diameter) having one vent port, and melt-mixed. Then, a blended material containing a carboxylic acid hydrazide and 5 parts by weight of a polyacetal resin copolymer particulate was fed to the extruder through a side feed port thereof to prepare a pelletized composition having a formulation shown in Table 2 (extrusion condition: L/D=35, extrusion temperature=200° C., screw rotation frequency=100 rpm, vent vacuum=70 cmHg (93.1 kPa), discharging rate=15 kg/hr, and average residence time=100 seconds).

From these pellets, prescribed test pieces were fabricated with an injection molding machine, and concerning each test piece, the moldability, the amount of formaldehyde emission from the test piece, and the bleeding property were evaluated. The results are shown in Table 2.

Comparative Examples 1 to 3

For comparison, samples prepared without any carboxylic acid hydrazide, as well as samples with addition of adipic acid hydrazide instead of the specific carboxylic acid hydrazide were evaluated in the same manner as the above. The results are shown in Table 3.

TABLE 1

| | Examples | | | | | | | |
| --- | --- | --- | --- | --- | --- | --- | --- | --- |
| | 1 | 2 | 3 | 4 | 5 | 6 | 7 | 8 |
| Polyacetal resin copolymer "a" (parts by weight) | a-1 100 | a-1 100 | a-2 100 | a-1 100 | a-1 100 | a-1 100 | a-1 100 | a-1 100 |
| Carboxylic acid hydrazide "b" (parts by weight) | b-1 0.5 | b-1 0.3 | b-1 0.3 | b-1 0.2 | b-1 0.4 | b-1 0.2 | b-1 0.4 | b-1 0.2 |
| Antioxidant "c" (parts by weight) | — | c-1 0.3 | c-1 0.3 | c-1 0.3 | c-2 0.3 | c-3 0.3 | c-1 0.3 | c-1 0.3 |
| Processing stabilizer "d" (parts by weight) | — | d-1 0.2 | d-1 0.2 | d-2 0.2 | d-1 0.2 | d-1 0.2 | d-3 0.2 | d-4 0.2 |
| Heat stabilizer "e" (parts by weight) | — | e-1 0.03 | e-1 0.03 | e-1 0.03 | e-2 0.03 | e-3 0.03 | e-4 0.03 | e-1 0.03 |
| Coloring agent "f" (parts by weight) | — | — | — | — | — | — | — | — |

TABLE 1-continued

|  |  |  |  |  |  |  |  |  |
|---|---|---|---|---|---|---|---|---|
| Weather (light)-resistant stabilizer "g" (parts by weight) | — | — | — | — | — | — | — | — |
| Moldability (mold deposit) | 3 | 4 | 4 | 5 | 4 | 5 | 5 | 5 |
| Amount of formaldehyde emission, Dry (μg/cm²) | 0.03 | 0.04 | 0.03 | 0.05 | 0.05 | 0.03 | 0.04 | 0.05 |
| Amount of formaldehyde emission, Humid (μg/cm²) | 0.06 | 0.08 | 0.07 | 0.08 | 0.08 | 0.06 | 0.07 | 0.07 |
| Bleeding property | B | A | A | A | A | A | A | A |

|  | Examples |  |  |  |  |  |  |
|---|---|---|---|---|---|---|---|
|  | 9 | 10 | 11 | 12 | 13 | 14 | 15 |
| Polyacetal resin copolymer "a" (parts by weight) | a-1 100 | a-1 100 | a-1 100 | a-1 100 | a-1 100 | a-1 100 | a-1 100 |
| Carboxylic acid hydrazide "b" (parts by weight) | b-2 0.2 | b-3 0.2 | b-4 0.2 | b-5 0.2 | b-6 0.2 | b-7 0.2 | b-8 0.2 |
| Antioxidant "c" (parts by weight) | c-1 0.3 | c-1 0.3 | c-1 0.3 | c-1 0.3 | c-1 0.3 | c-1 0.3 | c-1 0.3 |
| Processing stabilizer "d" (parts by weight) | d-1 0.2 | d-1 0.2 | d-1 0.2 | d-1 0.2 | d-1 0.2 | d-1 0.2 | d-1 0.2 |
| Heat stabilizer "e" (parts by weight) | e-1 0.03 | e-1 0.03 | e-1 0.03 | e-1 0.03 | e-1 0.03 | e-1 0.03 | e-1 0.03 |
| Coloring agent "f" (parts by weight) | — | — | — | — | — | — | — |
| Weather (light)-resistant stabilizer "g" (parts by weight) | — | — | — | — | — | — | — |
| Moldability (mold deposit) | 5 | 4 | 5 | 5 | 4 | 5 | 5 |
| Amount of formaldehyde emission, Dry (μg/cm²) | 0.04 | 0.04 | 0.04 | 0.05 | 0.03 | 0.03 | 0.03 |
| Amount of formaldehyde emission, Humid (μg/cm²) | 0.06 | 0.06 | 0.08 | 0.09 | 0.06 | 0.09 | 0.05 |
| Bleeding property | A | A | A | A | A | A | A |

TABLE 2

|  | Examples |  |  |  |  |  |  |  |  |  |
|---|---|---|---|---|---|---|---|---|---|---|
|  | 16 | 17 | 18 | 19 | 20 | 21 | 22 | 23 | 24 | 25 |
| Polyacetal resin copolymer "a" (parts by weight) | a-1 100 | a-1 100 | a-1 100 | a-1 100 | a-1 100 | a-1 100 | a-1 100 | a-1 100 | a-1 100 | a-1 100 |
| Carboxylic acid hydrazide "b" (parts by weight) | b-1 0.1 | b-1 0.1 | b-1 0.2 | b-1 0.2 | b-1 0.2 | b-1 0.2 | b-2 0.2 | b-1 0.1 | b-1 0.1 | b-1 0.15 |
| Antioxidant "c" (parts by weight) | c-1 0.3 | c-1 0.3 | c-1 0.3 | c-1 0.3 | c-1 0.03 | c-1 0.03 | c-1 0.3 | c-1 0.3 | c-1 0.3 | c-1 0.03 |
| Processing stabilizer "d" (parts by weight) | d-1 0.2 | d-3 0.2 | d-2 0.2 | d-1 0.2 | d-1 0.2 | d-1 0.2 | d-1 0.2 | d-1 0.2 | d-3 0.2 | d-1 0.2 |
| Heat stabilizer "e" (parts by weight) | e-4 0.03, e-5 0.05 | e-1 0.03, e-6 0.05 | e-3 0.03, e-7 0.05 | e-1 0.1 | e-1 0.1 | e-1 0.03 | e-1 0.1 | e-1 0.03 | e-1 0.03 | e-1 0.03 |
| Coloring agent "f" (parts by weight) | — | — | — | f-1 0.5 | — | — | f-1 0.5 | — | — | — |
| Weather (light)-resistant stabilizer "g" (parts by weight) | — | — | — | — | g-1 0.4, g-2 0.2 | g-1 0.4, g-2 0.2 | — | — | — | g-1 0.4, g-2 0.2 |
| Moldability (mold deposit) | 3 | 5 | 4 | 5 | 5 | 5 | 5 | 5 | 5 | 5 |
| Amount of formaldehyde emission, Dry (μg/cm²) | 0.03 | 0.03 | 0.04 | 0.13 | 0.22 | 0.08 | 0.11 | 0.03 | 0.04 | 0.07 |
| Amount of formaldehyde emission, Humid (μg/cm²) | 0.06 | 0.05 | 0.05 | 0.15 | 0.23 | 0.14 | 0.13 | 0.08 | 0.09 | 0.12 |
| Bleeding property | A | A | A | A | A | A | A | A | A | A |

TABLE 3

|  | Comparative Examples | | |
|---|---|---|---|
|  | 1 | 2 | 3 |
| Polyacetal resin copolymer "a" | a-1 | a-1 | a-1 |
| (parts by weight) | 100 | 100 | 100 |
| Carboxylic acid hydrazide "b" | — | b-9 | b-9 |
| (parts by weight) |  | 0.5 | 0.3 |
| Antioxidant "c" | c-1 | — | c-1 |
| (parts by weight) | 0.3 |  | 0.3 |
| Processing stabilizer "d" | d-1 | — | d-1 |
| (parts by weight) | 0.2 |  | 0.2 |
| Heat stabilizer "e" | e-1 | — | e-2 |
| (parts by weight) | 0.1 |  | 0.1 |
| Coloring agent "f" | — | — | — |
| (parts by weight) |  |  |  |
| Weather (light)-resistant stabilizer "g" | — | — | — |
| (parts by weight) |  |  |  |
| Moldability (mold deposit) | 5 | 1 | 2 |
| Amount of formaldehyde emission, Dry ($\mu g/cm^2$) | 4.00 | 0.04 | 0.16 |
| Amount of formaldehyde emission, Humid ($\mu g/cm^2$) | 1.58 | 0.07 | 0.27 |
| Bleeding property | A | C | C |

As apparent from the Tables, the amount of formaldehyde emission was considerably decreased or reduced in Examples as compared with Comparative Examples, indicating remarkable improvement in the working and using environment. Further, Examples improved in bleeding property, and thereby the quality of the molded product was enhanced.

Example 26

The polyacetal resin pellet obtained in Example 4 was supplied through a main feed port of a biaxial extruder (30 mm diameter) having one vent port, and the melt-mixing operation was repeated to prepare a palletized composition at a total residence time of 200 seconds (extrusion condition: L/D=35, extrusion temperature=200° C., screw rotation frequency=100 rpm, vent vacuum=70 cmHg (93.1 kPa), and discharging rate=15 kg/hr).

With the use of the resulting pellet, a prescribed test piece was formed by an injection molding machine, and the amount of formaldehyde emission from the test piece, and the bleeding property were evaluated. The amounts of formaldehyde emission were 0.09 $\mu g/cm^2$ under dry conditions, and 0.17 $\mu g/cm^2$ under humid conditions. The bleeding property was evaluated as "A". Moreover, the moldability (mold deposit) was evaluated, and determined as "5" of the moldability evaluation criteria.

Example 27

In a polyethylene bag, 100 parts by weight of the polyacetal resin pellet (not containing a carboxylic acid hydrazide) obtained in Comparative Example 1 and 0.1 part by weight of a carboxylic acid hydrazide (b-1) were put and blended to give a palletized composition containing the polyacetal resin mixed with the carboxylic acid hydrazide. With the use of the palletized composition, a prescribed test piece was formed by an injection molding machine. The amount of formaldehyde emission from the test piece, and the bleeding property were evaluated. As a result, the amounts of formaldehyde emission were 0.02 $\mu g/cm^2$ under dry conditions, and 0.06 $\mu g/cm^2$ under humid conditions. The bleeding property was evaluated as "A". Moreover, the moldability (mold deposit) was evaluated, and determined as "5" of the moldability evaluation criteria.

The polyacetal resin copolymers, the carboxylic acid hydrazides, the antioxidants, the processing stabilizers, the heat stabilizers, the coloring agents, and the weather (light)-resistant stabilizers used in the Examples and Comparative Examples are as follows.

1. Polyacetal resin copolymer "a"
(a-1): Polyacetal resin copolymer (melt index=9 g/10 min.)
(a-2): Polyacetal resin copolymer (melt index=27 g/10 min.)
Incidentally, the melt index was a value (g/10 min.) determined under conditions of 190° C. and 2169 g, based on ASTM-D1238.

2. Carboxylic acid hydrazide "b"
(b-1): 1,3-Bis(2-hydrazinocarbonylethyl)-5-isopropylhydantoin
(b-2): 3,9-Bis(2-hydrazinocarbonylethyl)-2,4,8,10-tetraoxaspiro[5.5]undecane
(b-3): 1-(2-Hydrazinocarbonylethyl)-2-methylimidazole
(b-4): 1,4-Bis(2-hydrazinocarbonylethyl)piperazine
(b-5): Bis[4-(N-(2-hydrazinocarbonylethyl)amino)phenyl]methane
(b-6): 1,3-Bis(2-hydrazinocarbonylethyloxy)benzene
(b-7): 2,2-Bis[4-(2-hydrazinocarbonylethyloxy)phenyl]propane
(b-8): 1-(2-Hydrazinocarbonylethyloxy)-4-(hydrazinocarbonyl)benzene
(b-9): Adipic acid dihydrazide 3. Antioxidant "c"
(c-1): Triethylene glycol bis[3-(3-t-butyl-5-methyl-4-hydroxyphenyl)propionate]
(c-2): Pentaerythritol tetrakis[3-(3,5-di-t-butyl-4-hydroxyphenyl)propionate]
(c-3): 2,2'-Methylenebis(4-methyl-6-t-butylphenol)

4. Processing stabilizer "d"
(d-1): Ethylenebisstearylamide
(d-2): Montanate [manufactured by Toyo-Petrolite Co., Ltd., "LUZA WAX-EP"]
(d-3): Glycerin monostearate
(d-4): Polyethylene oxide [molecular weight: 35000]

5. Heat stabilizer (metal salt of an organic carboxylic acid, alkaline earth metal salt, basic nitrogen-containing compound) "e"
(e-1): Tricalcium citrate tetrahydrate
(e-2): Magnesium stearate
(e-3): Tricalcium citrate dehydrate
(e-4): Calcium stearate
(e-5): Allantoin
(e-6): Biurea
(e-7): Nylon 6-66-610 [manufactured by DuPont, "Elvamide 8063R"]

6. Coloring agent "f"
(f-1): Carbon black (acetylene black)

7. Weather (light)-resistant stabilizer "g"
(g-1): 2-[2'-Hydroxy-3',5'-bis(a,a-dimethylbenzyl)phenyl]benzotriazole
(g-2): Bis(2,2,6,6-tetramethyl-4-piperidyl)sebacate

The invention claimed is:

1. A polyacetal resin composition which comprises a polyacetal resin, an antioxidant, a processing stabilizer, a heat stabilizer and an aliphatic carboxylic acid hydrazide represented by the following formula (1):

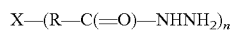  (1)

wherein X represents a hetero atom or a hetero atom-containing group having n-valence(s), R represents an alkylene group and n denotes an integer of 1 to 4;

wherein the antioxidant comprises at least one member selected from the group consisting of a hindered phenol compound and a hindered amine compound, and wherein the processing stabilizer comprises at least one member selected from the group consisting of a higher fatty acid or a derivative thereof, a polyoxyalkylene glycol, and a silicone compound, and wherein the heat stabilizer comprises at least one member selected from the group consisting of a basic nitrogen-containing compound, a phosphine compound, a metal salt of an organic carboxylic acid, an alkali or alkaline earth metal compound, a hydrotalcite, and a zeolite, wherein the basic nitrogen-containing compound is at least one member selected from the group consisting of an aminotriazine compound, a guanidine compound, a urea compound, an amino acid compound, an amino alcohol compound, an imide compound, an amide compound, and a hydrazine compound different from tile carboxylic acid hydrazide represented by the formula (1).

2. A resin composition according to claim 1, wherein, in the formula (1), the hetero atom-containing group X is a group corresponding to a hetero atom-containing compound which comprises a chain or cyclic amine, a chain or cyclic alcohol, or a chain or cyclic ether, and H is a straight or branched $C_{1-10}$alkylene group.

3. A resin composition according to claim 1, wherein the hetero atom-containing group X is a group corresponding to a hetero atom-containing compound which comprises an azacycloalkane, an azacycloalkene, an azacycloalkadiene, a cyclic urea, a cyclic imide, a monohydroxyarene, a polyhydroxyarene a bisphenol compound, an oxacycloalkane, or an oxaspiroalkane, and H is a straight or branched $C_{1-6}$alkylene group.

4. A resin composition according to claim 1, wherein the hetero atom-containing group X is a group corresponding to a hetero atom-containing compound which comprises at least one member selected from the group consisting of a cyclic ureide compound and a mono- or polyoxaspiro$C_{6-20}$alkane.

5. A resin composition according to claim 1, wherein the proportion of the aliphatic carboxylic acid hydrazide is 0.001 to 20 parts by weight relative to 100 parts by weight of the polyacetal resin.

6. A resin composition according to claim 1, which further comprises at least one member selected from the group consisting of a weather (light)-resistant stabilizer, an impact resistance improver, a gloss control agent, an agent for improving sliding property, a coloring agent, and a filler.

7. A resin composition according to claim 1, wherein the heat stabilizer comprises at least one member selected from the group consisting of an alkaline earth metal salt of an organic carboxylic acid, and an alkaline earth metal oxide.

8. A resin composition according to claim 1, wherein the heat stabilizer comprises an alkaline earth metal salt of a hydroxy acid.

9. A resin composition according to claim 6, wherein the weather (light)-resistant stabilizer comprises at least one member selected from the group consisting of a benzotriazole compound, a benzophenone compound, an aromatic benzoate compound, a cyanoacrylate compound, an oxalic anilide compound, and a hydroxyaryl-1,3,5-triazine compound.

10. A resin composition according to claim 6, wherein the impact resistance improver comprises at least one member selected from the group consisting of a thermoplastic polyurethane-series resin, an acrylic core-shell polymer, a thermoplastic polyester-series elastomer and a styrenic elastomer.

11. A resin composition according to claim 6, wherein the gloss control agent comprises at least one member selected from the group consisting to an acrylic resin and a styrenic resin.

12. A resin composition according to claim 6, wherein the agent for improving sliding property comprises at least one member selected from the group consisting of an olefinic polymer, a silicone-series resin, and a fluorine-containing resin.

13. A resin composition according to claim 1, wherein a pellet of the polyacetal resin coexists with the aliphatic carboxylic acid hydrazide or a master batch containing the aliphatic carboxylic acid hydrazide.

14. A process for producing a polyacetal resin composition, which comprises melt-mixing a polyacetal resin, an antioxidant, a processing stabilizer, a heat stabilizer and an aliphatic carboxylic acid hydrazide represented by the following formula (1) with an extruder, $$X-(R-C(=O)-NHNH_2)_n \tag{1}$$

wherein X represents a hetero atom or a hetero atom-containing group having n-valence(s), R represents an alkylene group and n denotes an integer of 1 to 4 wherein the antioxidant comprises at least one member selected from the group consisting of a hindered phenol compound and a hindered amine compound, and wherein the processing stabilizer comprises at least one member selected from the group consisting of a higher fatty acid or a derivative thereof, a polyoxyalkylene glycol, and a silicone compound, and wherein the heat stabilizer comprises at least one member selected from the group consisting of a basic nitrogen-containing compound, a phosphine compound, a metal salt of an organic carboxylic acid, an alkali or alkaline earth metal compound, a hydrotalcite, and a zeolite, wherein the basic nitrogen-containing compound is at least one member selected from the group consisting of an aminotriazine compound, a guanidine compound, a urea compound, an amino acid compound, an amino alcohol compound, an imide compound, an amide compound, and a hydrazine compound different from tile carboxylic acid hydrazide represented by the formula (1). and at least the aliphatic carboxylic acid hydrazide is fed to the extruder through a side feed port thereof and is mixed with the polyacetal resin.

15. A process for producing a polyacetal resin composition, which comprises melt-mixing a polyacetal resin, an antioxidant, a processing stabilizer, a heat stabilizer and an aliphatic carboxylic acid hydrazide represented by the following formula (1) with an extruder, $$X-(R-C(=O)-NHNH_2)_n \tag{1}$$

wherein X represents a hetero atom or a hetero atom-containing group having n-valence(s), R represents an alkylene group and n denotes an integer of 1 to 4 wherein the antioxidant comprises at least one member selected from the group consisting of a hindered phenol compound and a hindered amine compound, and wherein the processing stabilizer comprises at least one member selected from the group consisting of a higher fatty acid or a derivative thereof, a polyoxyalkylene clycol, and a silicone compound, and wherein the heat stabilizer comprises at least one member selected from the group consisting of a basic nitrogen-containing compound, a phosphine compound, a metal salt of an organic carboxylic acid, an alkali or alkaline earth metal compound, a hydrotalcite, and a zeolite, wherein the basic nitrogen-containing compound is at least one member selected from the group consisting of an aminotriazine compound, a guanidine compound, a urea compound, an amino acid compound, an amino alcohol compound, an imide compound, an amide compound, and a hydrazine compound different from tile carboxylic acid hydrazide represented by the formula (1), and the average retention time in the extruder is not longer than 300 seconds.

16. A molded product, which is formed from a polyacetal resin composition comprising a polyacetal resin, an antioxidant, a processing stabilizer, a heat stabilizer and an aliphatic carboxylic acid hydrazide represented by the following formula (1):

$$X-(R-C(=O)-NHNH_2)_N \qquad (1)$$

wherein X represents a hetero atom or a hetero atom-containing group having n-valence(s), R represents an alkylene group and n denotes an integer of 1 to 4;

wherein the antioxidant comprises at least one member selected from the goup consisting of a hindered phenol compound and a hindered amine compound, and wherein the processing stabilizer comprises at least one member selected from the goup consisting of a hindered fatty acid or a derivative thereof, a polyoxyalkylene glycol, and a silicone compound, and wherein the heat stabilizer comprises at least one member selected from the group consisting of a basic nitrogen-containing compound, a phosphine compound, a metal salt of an organic carboxylic acid, an alkali or alkaline earth metal compound, a hydrotalcite, and a zeolite, wherein the basic nitrogen-containing compound is at least one member selected from the group consisting of an aminotriazine compound, a guanidine compound, a urea compound, an amino acid compound, an amino alcohol compound, an imide compound, an amide compound, and a hydrazine compound different from tile carboxylic acid hydrazide represented by the formula (1).

17. A molded product according to claim 16, wherein (1) when the molded product is stored in a closed space for 24 hours at a temperature of 80° C., the amount of formaldehyde emission from the molded product is not more than 1.0 µg per one cm² of the surface area of the product, and/or (2) when the molded product is stored in a closed space for 3 hours at a temperature of 60° C. under saturated humidity, the amount of formaldehyde emission from the molded product is not more than 2 µg per one cm² of the surface area of the product.

18. A molded product according to claim 16, which is an automotive part, an electric or electronic device part, an architectural or pipeline part, a household utensil or cosmetic article part, or a medical device part.

* * * * *